(12) United States Patent
Constien

(10) Patent No.: US 9,522,710 B2
(45) Date of Patent: Dec. 20, 2016

(54) LOAD AND/OR TRANSPORT CART

(71) Applicant: MINIMOVE GmbH, Berlin (DE)

(72) Inventor: Hans Constien, Berlin (DE)

(73) Assignee: Greenpack GmbH, Hennigsdorf (DE)

( * ) Notice: Subject to any disclaimer, the term of this patent is extended or adjusted under 35 U.S.C. 154(b) by 123 days.

(21) Appl. No.: 14/395,371

(22) PCT Filed: Apr. 18, 2013

(86) PCT No.: PCT/DE2013/000202
§ 371 (c)(1),
(2) Date: Jan. 26, 2015

(87) PCT Pub. No.: WO2013/156018
PCT Pub. Date: Oct. 24, 2013

(65) Prior Publication Data
US 2015/0122566 A1 May 7, 2015

(30) Foreign Application Priority Data

Apr. 20, 2012 (DE) ........................ 10 2012 007 780

(51) Int. Cl.
| | |
|---|---|
| *B62K 5/05* | (2013.01) |
| *B62H 1/02* | (2006.01) |
| *B62J 6/02* | (2006.01) |
| *B62K 3/00* | (2006.01) |
| *B62K 5/08* | (2006.01) |

(Continued)

(52) U.S. Cl.
CPC . *B62K 5/05* (2013.01); *B62H 1/02* (2013.01); *B62J 6/00* (2013.01); *B62J 6/02* (2013.01); *B62K 3/002* (2013.01); *B62K 5/027* (2013.01); *B62K 5/08* (2013.01); *B62K 5/10* (2013.01); *B62K 9/02* (2013.01); *B62K 15/006* (2013.01); *B62K 2202/00* (2013.01)

(58) Field of Classification Search
CPC ........... B62K 5/05; B62K 3/002; B62K 5/027; B62K 9/02; B62K 2202/00; B62H 1/02
See application file for complete search history.

(56) References Cited

U.S. PATENT DOCUMENTS 5,820,146 A * 10/1998 Van Ligten ........... B62B 5/0023
                                                        280/47.19
6,520,525 B1    2/2003  Yoon
(Continued)

FOREIGN PATENT DOCUMENTS

DE    81 28 047.5     3/1982
DE    102 04 478      8/2003
(Continued)

*Primary Examiner* — Faye M Fleming
(74) *Attorney, Agent, or Firm* — Norris McLaughlin & Marcus, P.A.

(57) ABSTRACT

A transport and load cart in the form of a kick scooter is compact, has a low dead weight and is designed with dimensions that are suitable for transport by train or automobile, and which nonetheless ensures safe transport of bulky and heavy goods together with a person, while improving the handling and reducing the expenditure of force. The longer side of the loading platform is disposed transversely to the travel direction and in a rearwardly inclined and/or displaceable manner relative thereto, and the receiving compartment has a front-side slot for the rechargeable battery.

24 Claims, 34 Drawing Sheets

(51) Int. Cl.
*B62K 5/10* (2013.01)
*B62K 9/02* (2006.01)
*B62K 15/00* (2006.01)
*B62J 6/00* (2006.01)
*B62K 5/027* (2013.01)

(56) References Cited

U.S. PATENT DOCUMENTS

| | | | | |
|---|---|---|---|---|
| 8,631,892 | B2* | 1/2014 | Constin | B62B 1/002 |
| | | | | 180/208 |
| 2002/0153683 | A1* | 10/2002 | Lee | B62K 15/006 |
| | | | | 280/87.021 |
| 2010/0164193 | A1* | 7/2010 | Abel | B62K 3/002 |
| | | | | 280/87.041 |
| 2013/0153322 | A1 | 6/2013 | Constin | |

FOREIGN PATENT DOCUMENTS

| | | |
|---|---|---|
| DE | 10 2006 042 112 | 3/2008 |
| DE | 20 2008 006 764 | 7/2008 |
| DE | 10 2011 106 561 | 12/2011 |
| EP | 1 704 901 | 9/2006 |
| FR | 2 926 961 | 8/2009 |
| WO | WO-95/08466 | 3/1995 |
| WO | WO-01/72164 | 10/2001 |

\* cited by examiner

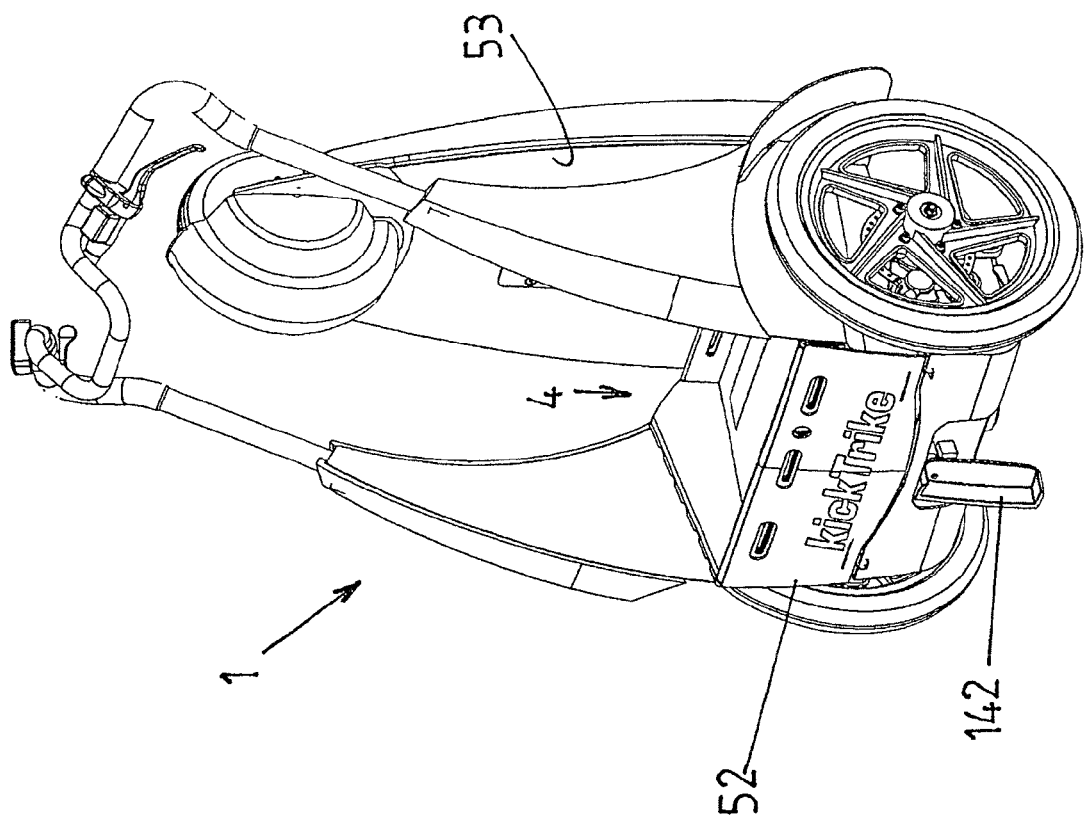

LOAD AND/OR TRANSPORT CART

BACKGROUND OF THE INVENTION

The invention relates to a load and/or transport cart in the form of a kick scooter, which comprises at least three wheels, a handlebar, a loading platform and a footboard that can be folded up and locked, wherein the two front wheels are configured with a steering and inclination mechanism for absorbing the centrifugal force during cornering, the handlebar is connected to the loading platform via at least one steering column, and a receiving compartment for a rechargeable battery is provided beneath the loading platform.

It is known that shopping carts provide great help for transporting purchased goods, without the purchased goods having to be carried. However, the shopping carts can generally only be moved at pedestrian speed, which greatly limits the operating range of these carts. While a bicycle including a shopping basket or saddle bags increases the operating range for transport, it is too bulky and not suitable for transporting heavy shopping goods, such as beverage crates. Conventional kick scooters or kickboards are also not suitable for this.

DE 10 2006 042 1129 A1 describes a load cart comprising three wheels, a fold-up footboard and a loading surface on the front side, on which the heavy, bulky loads can be loaded and transported, wherein the front wheels can be inclined relative to the roadway during cornering by bevel gears.

Moreover, a supporting structure that is provided with rollers and includes at least one grip element disposed on a rod assembly for guiding the supporting structure is known from DE 20 2008 006 764 U1. A skateboard is associated with the supporting structure as a standing platform for the user. The grip element is provided as a steering means for the rollers, which, together with the supporting structure, are disposed rotatably about a steering axle situated transversely to the at least one axis of the structure during the steering motion.

Moreover, load carts that are provided with three wheels are known from FR 2 926 961 A1 and U.S. Pat. No. 6,520,525 B1.

The applicant moreover proceeds from a load and/or transport cart which is the subject of U.S. Pat. No. 8,631,892 B2. This load and/or transport cart comprises, beneath the loading platform, a triangular steering plate having two opposing ball heads, wherein each of the ball heads is seated in an articulated manner in a bearing at one end of the steering lever, wherein these levers at the respective other ends comprise a bearing for a further ball head of a triangular swinging fork, on the stub axles of which the front wheels are rotatably mounted.

All these solutions have the shared disadvantage that the carts have a relatively bulky and heavy design, provide limited handling and, due to their significant dimensions, are often not suitable for being transported by train and in the person's own car.

Loading surfaces that are disposed in front of the front wheels (see FR 2 926 961 A1, WO 01/72164 A1, EP 1 704 901 A1, WO 95/08466 A1, DE 102 04 478 A1, DE 81 28 047 U1) shift the center of gravity of the load into a position that is not always sufficient to ensure the safety of the cart, so that the user must apply the corresponding counter forces to ensure that the cart does not tilt forward.

SUMMARY OF THE INVENTION

Based on this prior art, it is the object of the invention to provide a transport and load cart in form of a kick scooter, which is compact, has a low dead weight and is designed with dimensions that are suitable for transport by train or in the car, and which nonetheless ensures safe transport of bulky and heavy shopping goods together with people, while improving handling and reducing the expenditure of force.

The solution according to the invention is based on the realization that the stability of upwardly projecting loads can be secured during travel by shifting the center of gravity downward by disposing the longer side of the loading platform transversely to the travel direction and in a rearwardly inclined and/or displaceable manner counter to the travel direction, and by the receiving compartment having a front-side slot for the rechargeable battery.

This makes it possible to significantly reduce the folded dimensions of the load and/or transport cart according to the invention, so that transport by car, by train or by bus is considerably facilitated.

In a further preferred embodiment of the invention, compactness is further achieved in that the steering and inclination mechanism comprises two axle shafts, which are located on a shared rotational axis and each have a rotationally fixed contrate gear, which are operatively connected to each other in a meshing manner via a steering gearwheel that is disposed perpendicularly to the rotational axis and a compensating gearwheel, wherein each axle shaft is provided with a wheel axle that is offset eccentrically to the rotational axis for the front wheel, the two wheel axles are disposed on a shared rotational axis aligned with each other, and the steering gearwheel and the compensating gearwheel have a rotational axis that coincides with the vertical steering axle, wherein the steering gearwheel is rigidly fixed in the steering axle for transferring the steering motion, and the compensating gearwheel can rotate freely, so that the contrate gear, together with the axle shaft, can carry out an opposing rotational movement with respect to the contrate gear, together with the axle shaft, during a steering motion, and the wheel axles define a plane of inclination for the loading platform.

Of particular advantage for the compact design is that the inclination and steering mechanism is accommodated in a gearbox housing that is joined from multiple pieces in a force-fit manner and made of injection molding, cast metal or sheet metal, or corresponding material combinations, wherein the steering axle is coupled to the footboard by way of a fork or a fork mount.

One variant embodiment of the load and/or transport cart according to the invention provides for the gearbox housing to be made of injection molding or cast metal and to comprise:

a) an outer housing bottom, which is molded in the axial direction of the axle shafts and has an at least partially hemispherically shaped recess for a lower radial ball bearing;

b) an inner housing bottom, which is disposed perpendicularly to the axle shafts and extends with U-profile-shaped legs in the direction of the footboard, and the hemispherical shell of which is seated in the hemispherical recess of the outer housing bottom and carries a centrally vertically projecting shaft stub in a rotationally fixed manner, around which the compensating gearwheel is rotatably mounted, wherein the shaft stub penetrates the hemispherical shell and is guided into the lower radial ball bearing to absorb the steering motion;

c) a hemispherically designed shell of an inner housing top, which can be placed on the shell of the inner housing bottom and which comprises a further shaft stub, which extends in the direction of the shaft stub and is rigidly fixed to the shell and on which the steering gearwheel is rigidly fixed for transferring the steering motion and which penetrates the hemispherical shell of the inner housing top and is guided into an upper radial ball bearing to absorb the steering motion, wherein the upper radial ball bearing and the shaft stub are covered by a steering axle cover; and d) an outer housing top, which can be placed on the inner housing top and has a base side comprising an opening and on which an intermediate plate having an opening that corresponds to the opening in the base side is inserted, in which the shaft stub is disposed in a freely rotating manner with the steering axle cover.

In a preferred refinement of the invention, the receiving compartment for the rechargeable battery is disposed above the inner housing top, wherein the battery compartment is formed by the space defined by the upwardly projecting wall region and the base of the outer housing top as well as the lower region of the loading platform, and the height of the handlebar can be adjusted in, and the handlebar can be locked in, the steering columns by way of a clamping and locking mechanism. The front-side openings in the wall region of the outer housing top and of the lower region of the loading platform can advantageously be covered by a battery flap that can be pivoted in the travel direction.

It is furthermore advantageous that the outer upper housing top is provided with a perpendicularly projecting, peripheral wall region that is open at the front, on which the loading platform, together with the wheel houses thereof molded into the steering columns, is insertably fixed so that, during a steering motion of the handlebar, the outer joint top and the outer joint bottom, together with the loading platform, can pivot about the steering axle defined vertically through the openings.

It is furthermore of particular advantage that pipe-section-like guide segments made of metal for inserting the handlebar pipe ends are provided in the steering columns of the loading platform, wherein at least two openings located vertically at a distance from each other are introduced into the wall of the handlebar pipe in accordance with the desired adjustment height of the handlebar, and that a respective mechanism for clamping, locking and releasing the handlebar pipe is disposed at the upper region of the steering columns, the pivotable grip of the handlebar pipe moving a locking pin into the opening of the handlebar pipe for locking, or moving the same out for releasing.

This makes it possible to adapt the height of the load and/or transport cart according to the invention to a size that is suitable for transport in the trunk of a car, on the bus or on the train. The loading platform is made of an injection-molded plastic part, and preferably of impact-resistant polyamide, wherein the pipe-section-like guide segments are embedded in the steering columns, whereby the weight of the load and/or transport roller according to the invention can be reduced.

In a further preferred variant embodiment of the invention, it is provided that all essential components of the load and/or transport cart are made of metal, wherein the gearbox housing is preferably fabricated from sheet metal and in particular comprises:

a) a lower gear plate having a recess for a lower tapered roller bearing accommodating the steering axle;

b) an upper gear plate having a molded extension for an upper tapered roller bearing accommodating the steering axle;

c) a fork mount, which vertically encloses the contrate gears, the steering gearwheel, and the compensating gearwheel, and the steering axle on the outside parallel to the steering axle direction and is formed of receiving panels and which has two upper bearing plates attached thereto and a lower bearing plate having axial guides for a shaft with a steering axle, on which the steering gearwheel is non-rotatably disposed and the compensating gearwheel is rotatably disposed, wherein the receiving panels of the fork mount have cut-outs which are associated with the contrate gears and through which the axle shafts are guided to the contrate gear and in which the axle shafts can be pivoted about the steering axle in accordance with the handlebar movement;

d) at least one inner and one outer bearing shell for each axle shaft, wherein the axle shaft is rotatably mounted in an angular ball bearing accommodated by the inner bearing shell and in a needle bearing accommodated by the outer bearing shell; and e) a front plate and a rear plate, which are joined to the lower gear plate, the upper gear plate, the bearing shells, the bearing plates and the receiving panels of the fork mount by way of screw connections.

In a further preferred embodiment of this variant embodiment, two upwardly projecting steering columns in the form of a cut sheet metal piece that is bent multiple times are attached to the upper gear plate by way of screw connections, wherein the cut sheet metal piece is formed of a base leg that faces the gear plate and has cut-outs for the molded extension in the upper gear plate accommodating the upper tapered roller bearing and for attachment, an outer wall section projecting perpendicularly upward from the base leg, an oblique wall part projecting outwardly from this wall section, and a side wall part projecting perpendicularly upward from the latter, and that a box-shaped base part is provided, which can be placed on and attached approximately at the height of the inwardly extending oblique wall parts, and a support, panel for forming the receiving compartment for the insertion of the rechargeable battery on the front side is disposed on the base legs of the two steering columns, wherein the box-shaped loading platform is inserted into the base part and held there.

According to one preferred refinement of the invention, at least two holders, disposed on top of each other, for the handlebar pipe having a locking mechanism for adjusting the height of the handlebar are provided in the upper region of the side wall part of each cut sheet metal piece. The side wall part is provided with a removable outer facing, which covers the holders for the handlebar pipes and imparts appropriate shaping to the side wall parts.

In a further embodiment of the load and/or transport cart according to the invention, the loading platform comprises a base that is provided with a rim to receive a transport container in a stable manner. The base of the loading platform is advantageously provided with a detent mechanism, the catch lug of which engages with a spring-loaded rocker in a detent opening introduced into the base part of the transport container in a securing manner or is designed so as to be movable out of the same.

According to a further embodiment of the load and/or transport cart according to the invention, this transport container is composed of a base part that is adapted to the base of the loading platform, a front part, and a rear part, which are hinged to the base part by way of hinges, wherein the opening angle between the front and rear parts is dimensioned so that at least three beverage crates can be stacked on top of each other, wherein the front and rear parts can be connected to each other in a securing manner by a flexible adjustable tightening strap. However, the transport container can also be formed of a front element having a reinforced base or of a flexible container or sack, without departing from the invention.

The loading platform is made of an injection-molded plastic part or cast metal, or is made entirely of sheet metal, or a combination of materials. Impact-resistant polyimide or cast aluminum are particularly suitable.

In a further embodiment of the load and/or transport cart according to the invention, the end of the footboard which is located at the front in the travel direction comprises a connecting element having two legs that are mutually spaced apart and parallel to each other, wherein a supporting roller is rotatably mounted in the legs at the front end of the connecting element for stably folding up the footboard, and the legs are provided with a recess that is introduced in the direction of the upper face of the footboard for receiving a splined shaft, which is disposed between the U-profile-shaped legs or receiving panels of the fork mount and is disposed in alignment with the recess in an opening of the legs or receiving panels, wherein a pivotably mounted lever between the legs or receiving panels is provided for locking and releasing the footboard, and a through-hole for receiving a joint axis is provided in the web for folding up the footboard, the joint axis being guided through a respective opening in the U-profile-shaped legs of the inner housing bottom which enclose the connecting element.

It is particularly advantageous for folding the footboard up and down if the footboard is provided with a worm gear mechanism that is driven by a motor and is operatively connected to the joint axis.

In a further variant embodiment of the load and/or transport cart according to the invention, the handlebar is provided with a brake actuating device, a device for accelerating, a bell, an indicator light, headlights and a cockpit, which includes a compartment having a transparent cover for reading and accommodating a telecommunications device in a water-proof manner, a connection that is connected to the rechargeable battery for charging the telecommunications device, a display device for the charge state and the safety of the rechargeable battery, and a speed indicator.

It is further of particular advantage that the footboard comprises a foldable and height-adjustable standing seat for the driver, wherein this standing seat is composed of two legs, a U-shaped arch comprising a backrest at the center, and two tubular rods in which the legs are inserted, the height of which can be adjusted and fixed, wherein the tubular rods are rotatably mounted in bearing brackets that are rigidly installed on the footboard, and wherein the tubular rods are fixed in the vertical position and in the folded position, and a saddle can be installed for the seat in place of the backrest.

A prop is provided for particularly easy handling of the transport and/or load cart according to the invention when folding up the footboard, the prop ensuring stability to prevent toppling over in the forward direction.

A further variant embodiment of the load and/or transport cart according to the invention provides for the rear wheel of the load and/or transport cart to comprise an electric wheel hub motor for driving purposes.

However, the invention also covers a design where the two front wheels, or all wheels, are configured with electric wheel hub motors, wherein in curves the wheel located on the inside rotates more slowly than the wheel located on the outside by way of electronics as a function of the steering action.

Likewise, however, the two front wheels can be driven by only one motor, which is connected to the wheels via a differential gear. In this case, the rear wheel is designed as a swivel wheel. The drive motor can be accommodated in the hollow axle shaft of the front wheel in a space-saving manner, for example.

In this way, the load and/or transport cart according to the invention can be variably designed for different drive forms.

It is further advantageous if the footboard, the gearbox housing, and preferably the outer housing bottom, the outer housing top, the inner housing top, and the inner housing bottom, are injection-molded parts made of impact-resistant plastic material, whereby the load and/or transport cart according to the invention remains lightweight, but nonetheless compact for transport and handling. The invention, of course, also provides that the essential components of the load and/or transport cart according to the invention are made of metal, for example cast metal, or are entirely made of sheet metal.

Further advantages and details will be apparent from the following description with reference to the accompanying drawings.

The invention will be described in more detail hereafter based on two exemplary embodiments.

FIGS. 1 to 28 show the first exemplary embodiment of a load and transport cart according to the invention made of injection-molded plastic parts or cast metal, and FIGS. 29 to 35 show the second exemplary embodiment of a load and transport cart in a sheet metal design.

BRIEF DESCRIPTION OF THE DRAWINGS

In the drawings:

FIG. 35 shows a perspective illustration of the load and/or transport cart according to the invention with a folded-up footboard and folded-out prop.

DETAILED DESCRIPTION OF THE INVENTION

Exemplary Embodiment

Figure 1:
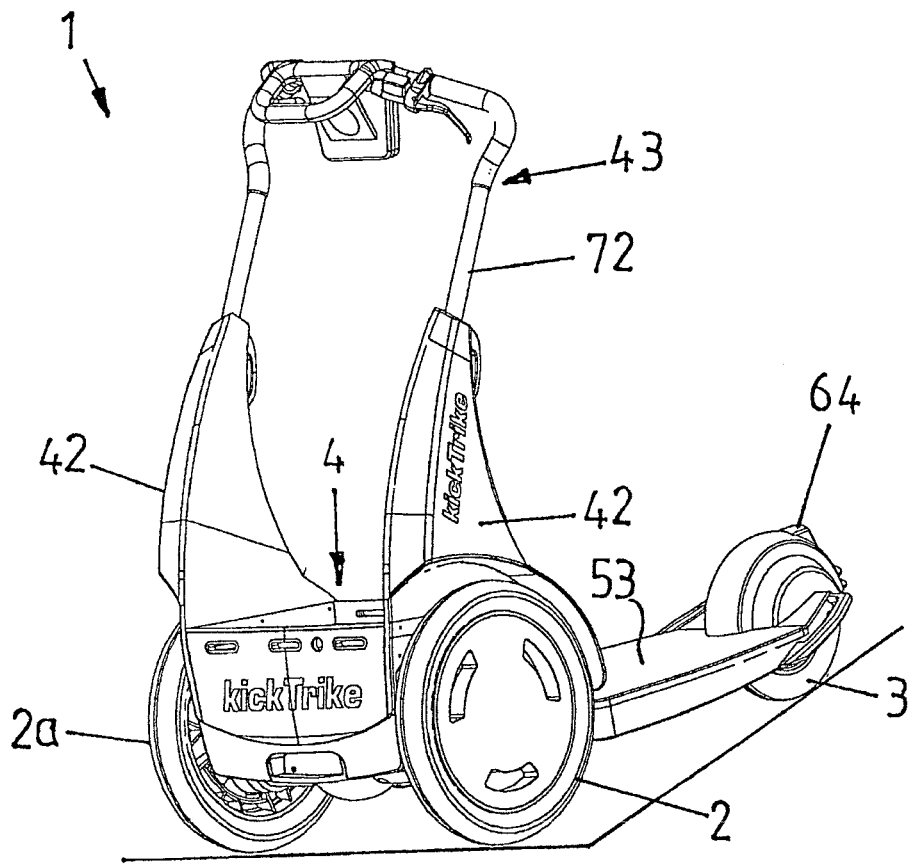
FIG. 1 shows a perspective view of the load and/or transport cart while driving straight ahead.

FIG. 1 shows the basic design of the load and/or transport cart 1 according to the invention, comprising the two front wheels 2 and the rear wheel 3.

The longer side LS of the loading platform 4 is located transversely to the travel direction FR and assumes a position relative thereto that is inclined slightly toward the rear so as to ensure sufficient stability of the load during travel. The angle of inclination α is approximately 5°. However, it is also possible to longitudinally displace the loading platform 4 in or against the travel direction so as to achieve as low a center of gravity of the load as possible.

Figure 2:
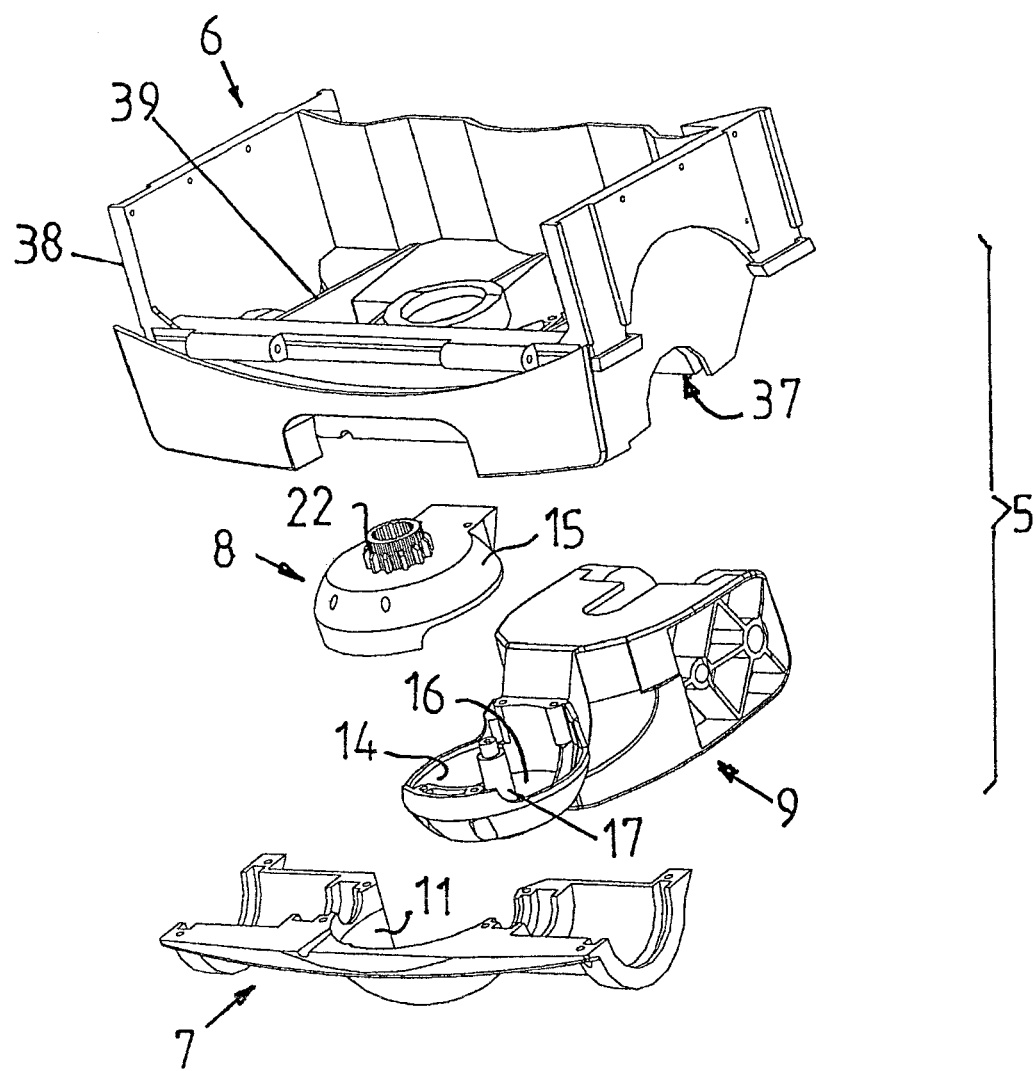
FIG. 2 shows an exploded view of the gearbox housing for the steering and inclination mechanism in a perspective view.
Figure 3:
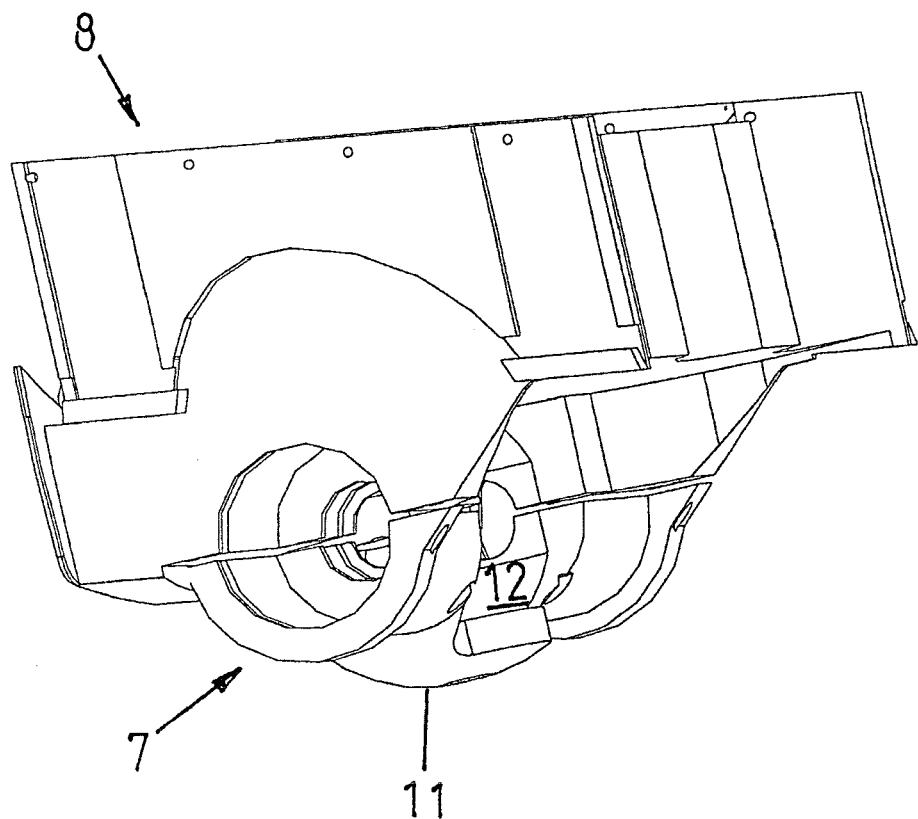
FIG. 3 shows an enlarged perspective view of the outer housing top connected to the outer housing bottom.
Figure 4:
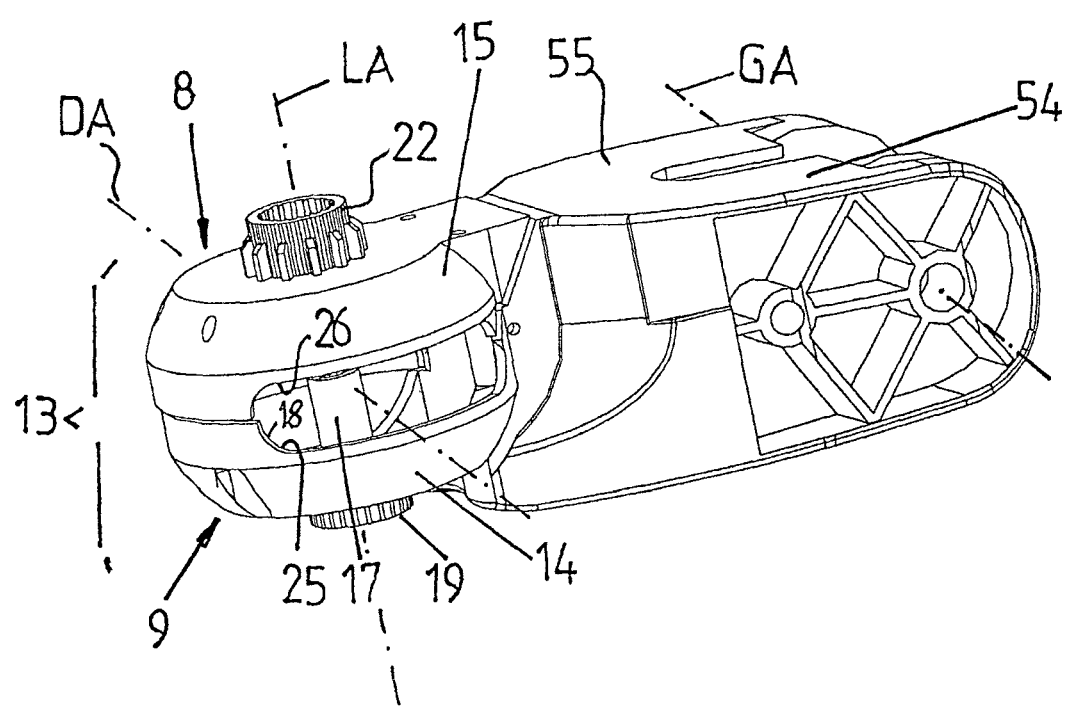
FIG. 4 shows an enlarged perspective view of the inner housing top connected to the inner housing bottom.

The loading platform 4 comprising the handlebar 43 is located between the two front wheels 2 and 2a. A multi-piece gearbox housing 5 is disposed beneath the loading platform 4, the gearbox housing being composed of an outer housing top 6, an outer housing bottom 7, an inner housing top 8, and an inner housing bottom 9 (see FIG. 2). The outer housing top 6 and the outer housing bottom 7 are provided with an upper and a lower hemispherical recess 10 and 11, respectively, which together form a ball-head-shaped receiving space 12 when the outer housing top 6 is placed on the outer housing bottom 7 and connected by way of screws (FIG. 3). A hollow ball head 13, which is composed of a hemispherical shell 14 of the inner housing bottom 9 and a hemispherical shell 15 of the inner housing top 8, is mounted in the steering axle LA in this receiving space 12, as shown in FIG. 4. A shaft stub 17, which is held non-rotatably in the wall 18 of the shell 14 and is mounted with the stub end 19 thereof penetrating the wall 18 in a radial ball bearing 20, projects centrally from the base 16 of the shell 14 and, as is shown in FIG. 2, vertically upward into the interior of the shell 14, the radial ball bearing being accommodated in the lower hemispherical recess 11 of the outer housing bottom 7.

Figure 5:
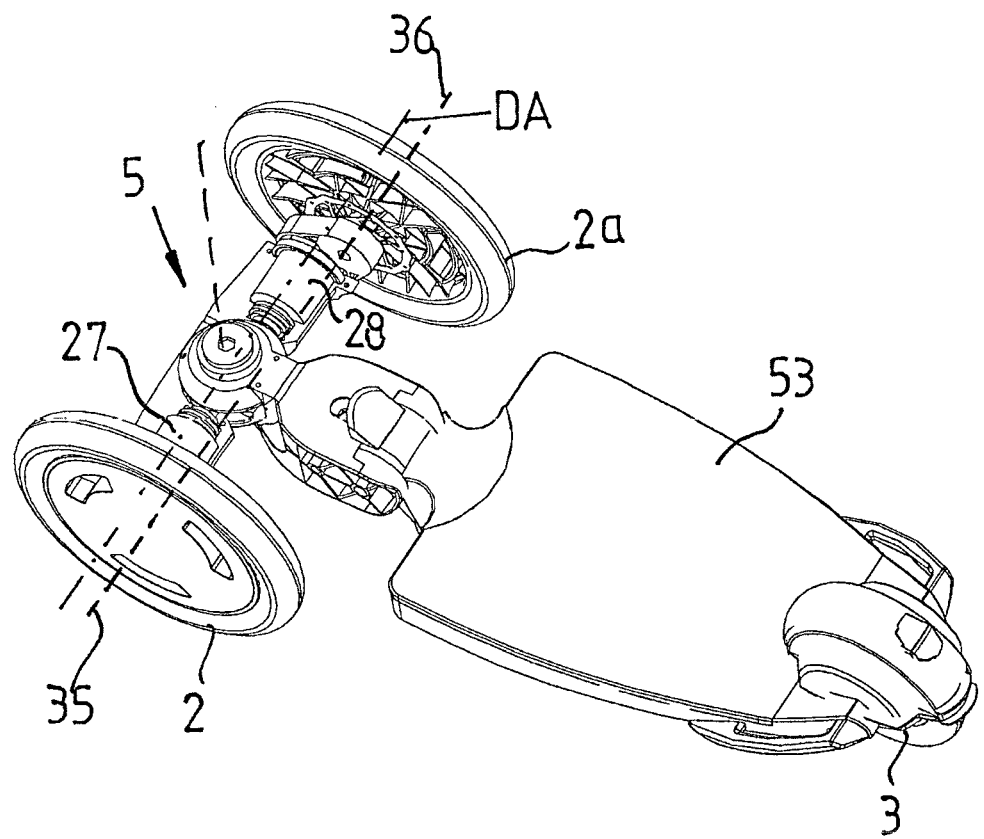
FIG. 5 shows a perspective top view onto the footboard coupled to front wheels, axle shafts, inner housing bottom and housing top.

FIG. 5 shows the assembled gearbox housing 5 comprising the mounted footboard 53, from which the positions of the rotational axis DA of the axle shafts 27 and 28, the wheel axles 35 and 36, and the steering axle LA are apparent.

Figure 6:
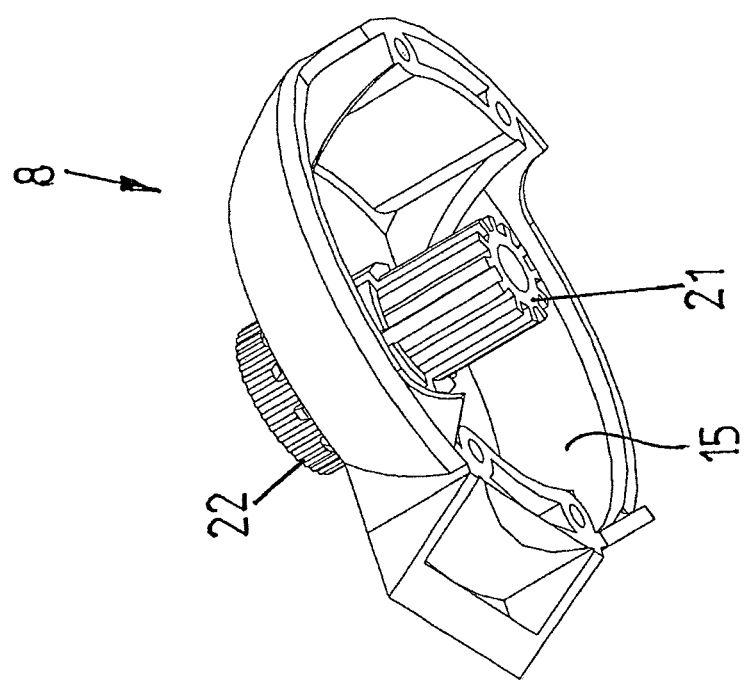
FIG. 6 shows a perspective view of the inner housing top.

FIG. 6 shows a bottom view of the inner housing top 8, the shell 15 of which non-rotatably carries a shaft stub 21 projecting upward centrally in the direction of the shaft stub 17 of the inner housing bottom 9. The shaft stub 21 penetrates the shell 15 and the end 22 thereof is mounted in a radial ball bearing 23, which is accommodated in a steering cover 24. The inner housing top 8 is placed onto the inner housing bottom 9 and is attached thereto by way of screws, which are not shown.

Figure 7:
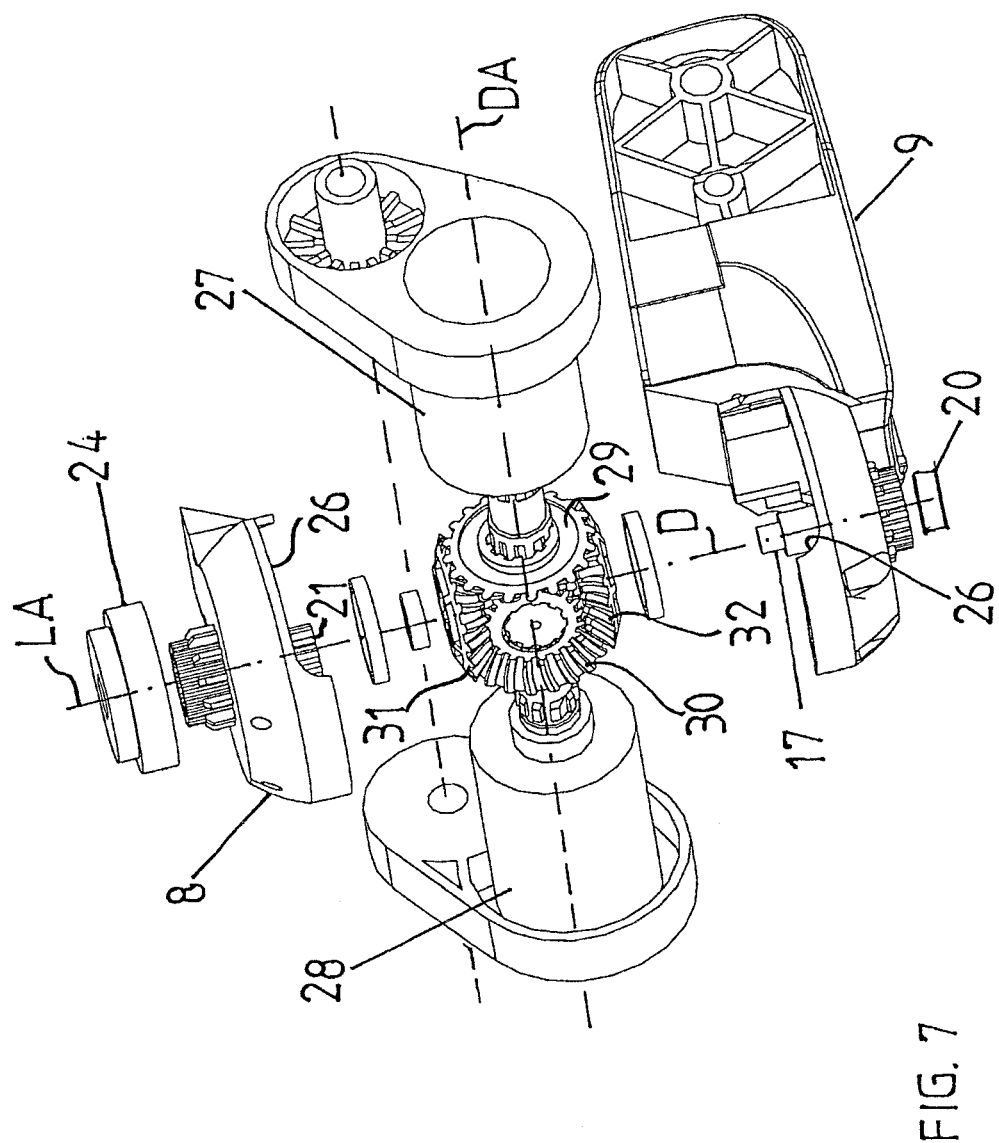
FIG. 7 shows an exploded view of the steering and inclination mechanism comprising contrate gears, steering gearwheel, compensating gearwheel and axle shafts in the inner housing top and the inner housing bottom.

FIG. 7 shows an exploded view of the axle shafts 27 and 28 that are provided with the contrate gears 29 and 30, the steering gearwheel 31, and the compensated gearwheel 32 in association with the inner housing top 8 and the inner housing bottom 9. Recesses 25 and 26 are introduced into the shells 14 and 15 of the inner housing bottom 9 and housing top 8 diametrically opposite each other in the direction of the axle shafts 27 and 28, the axle shafts 27 and 23 comprising contrate gears 29 and 30 attached non-rotatably thereto being guided through these recesses into the interior of the hollow ball head 13. The two contrate gears 29 and 30 are in meshing engagement with an upper steering gearwheel 31 and a lower compensating gearwheel 32, wherein the upper steering gearwheel 31 is non-rotatably attached to the shaft stub 21 of the inner housing top 8, and the lower compensating gearwheel 32 is rotatably mounted on the shaft stub 21 of the inner housing bottom 9 and is surrounded by the ball head 13 in a cane-like manner.

The rotational axes D of the steering gearwheel 31 and of the compensating gearwheel 32 coincide with the steering axle LA defined perpendicularly to the rotational axes DA of the axle shafts 27 and 28, wherein the axle shafts 27 and 28 are mounted in the outer housing bottom 16 in ball bearings so as to be radially and axially rotatable about the rotational axis DA, which are not shown.

The outer housing top 6 and the outer housing bottom 7 can thus pivot together with all installations and attachments during a steering motion about the steering axle LA.

Figure 8:
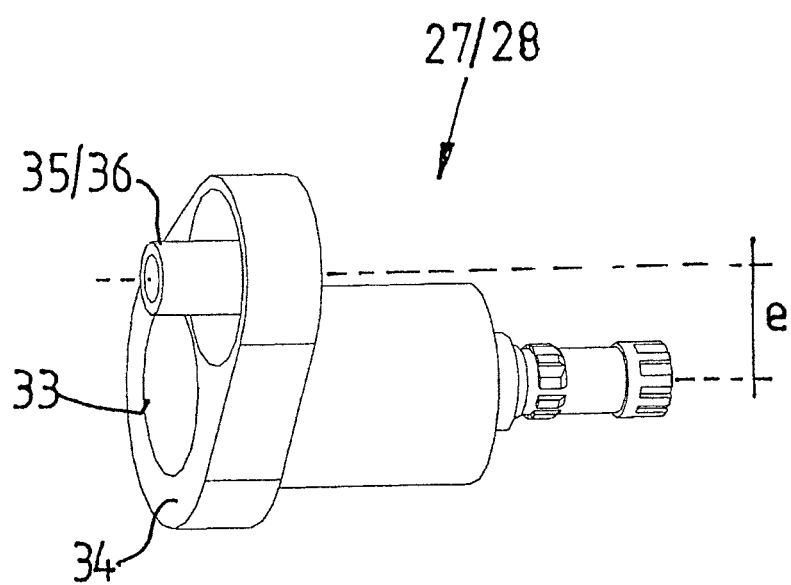
FIG. 8 shows an illustration of the composition of the axle shaft with wheel axles in a perspective view.

The axle shaft 27 or 28 is made of a hollow shaft 33 having an eccentrically integrally molded flange 34, on which a respective wheel axle 35 or 36 for the front wheel 2 or 2a is disposed. The wheel axles 35 and 36 are located on a horizontal line L relative to each other, however—as is shown in FIG. 8—disposed offset at a distance e from the rotational axis DA of the axle shafts 27 and 28.

The two front wheels 2 and 2a are rotatably mounted on the wheel axles 35 and 36, respectively, and are provided with a braking device, which is not shown in detail.

Figure 9:
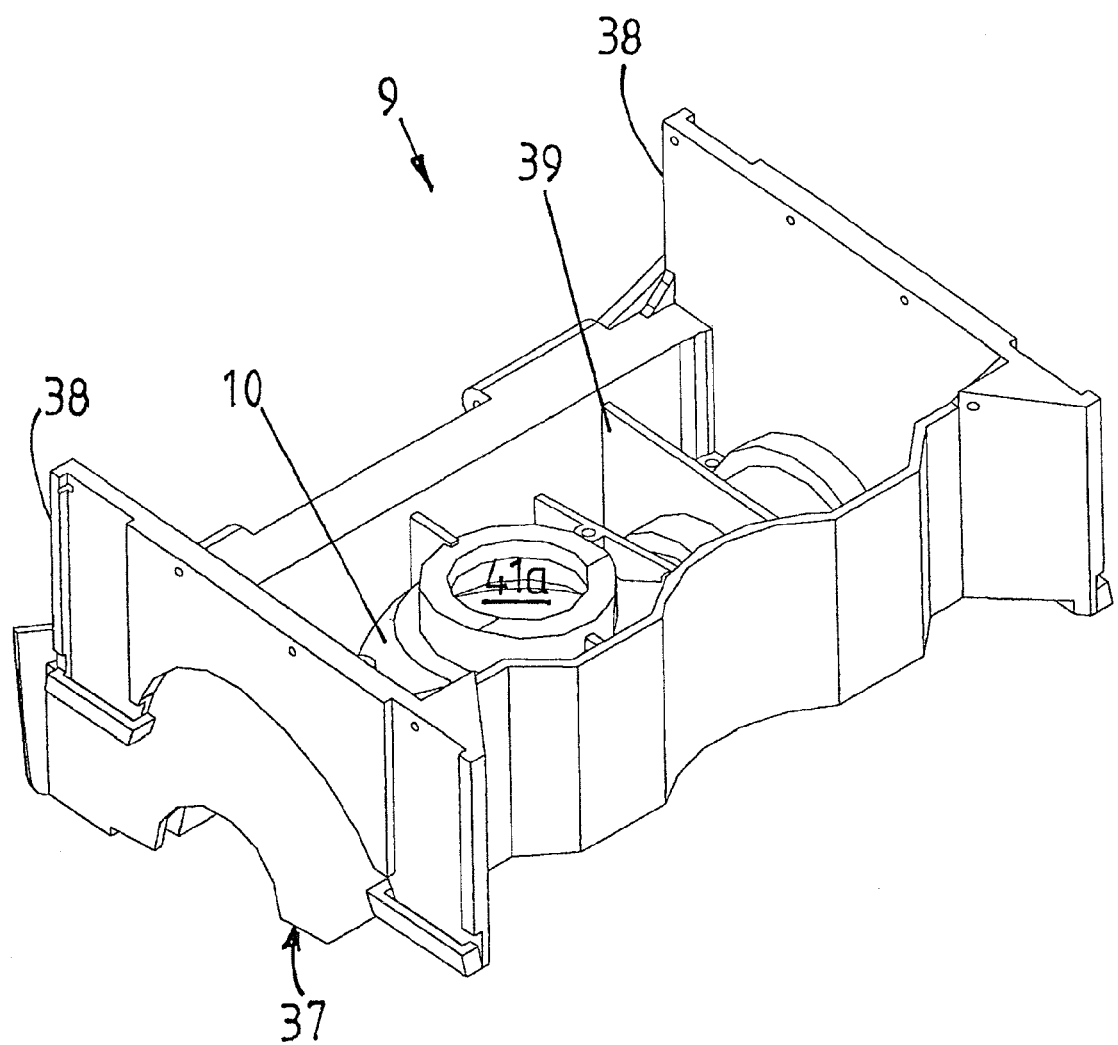
FIG. 9 shows a perspective view of the outer housing top in a top view.
Figure 10:
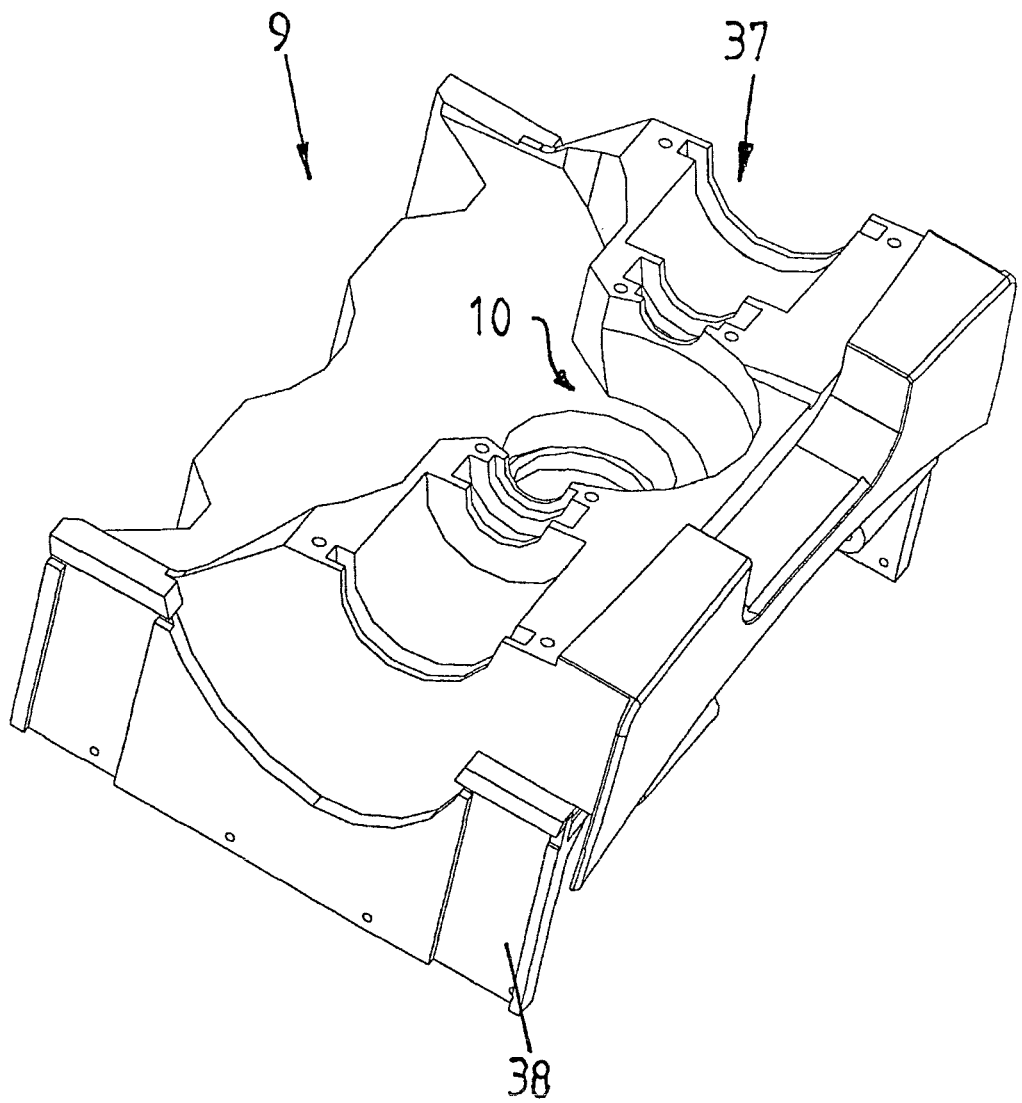
FIG. 10 shows a perspective bottom view of the outer housing top.

Reference is now made to FIGS. 9 and 10, which show the outer housing top 6 in a perspective top view and bottom view. The outer housing top 6, the base side 37 of which has a shell-like design and is provided with the hemispherical recess 10 for the hollow ball head 13, comprises a peripheral wall region 38, which projects upwardly from the base side 37 and is open at the front.

Figure 11:
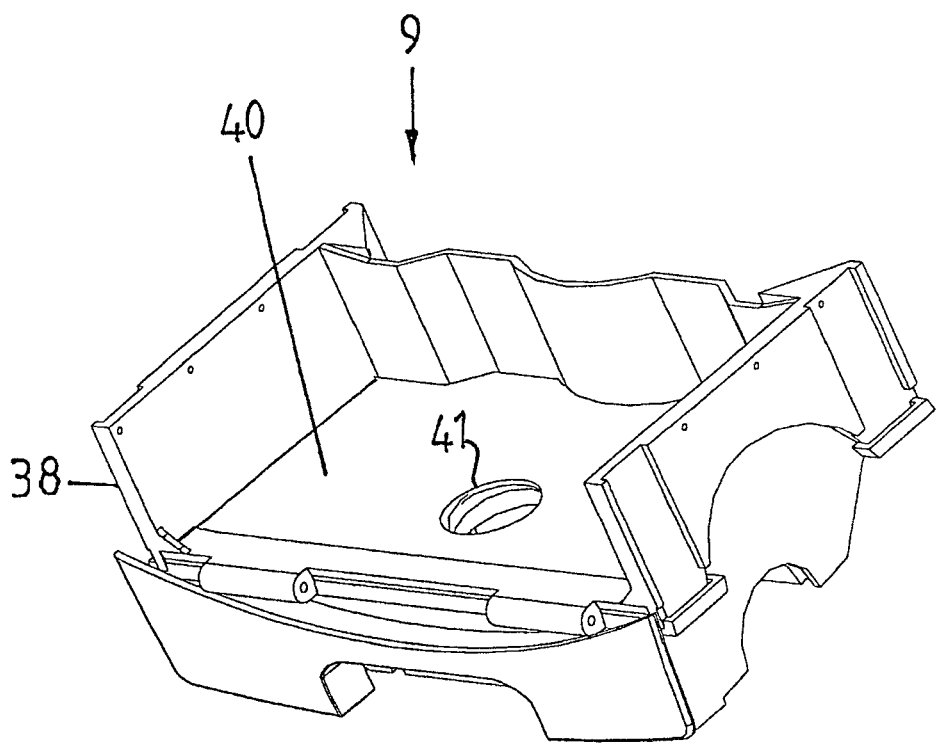
FIG. 11 shows a view of the outer housing top comprising an inserted intermediate plate according to FIG. 9.

The base side 37 is provided with supports 39 for placing on an intermediate plate 40, into the center of which an opening 41 is introduced for receiving the shaft stub 21 that is rotatably mounted in the steering axle cover 24. This opening 41 is associated with an opening 41a in the base side 37 of the outer housing top, through which the shaft stub 21 is guided. The supports 39 are designed so that the intermediate plate 40 can be held securely by the surrounding wall region 48. FIG. 11 shows the outer housing top 7 comprising the inserted intermediate plate 40.

Figure 12:
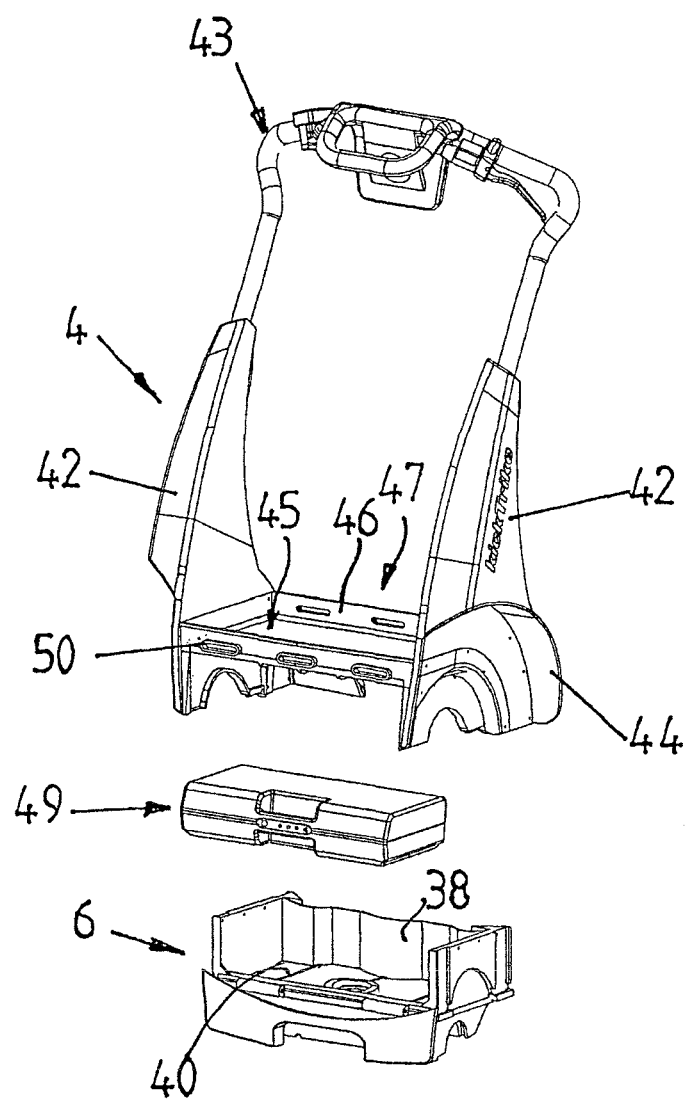
FIG. 12 shows a perspective exploded view of the handlebar, loading platform, battery and outer housing top.

FIG. 12 shows the loading platform 4 comprising integrally molded steering columns 42 and the outer housing top 6 in an exploded view. The mechanism for adjusting the handlebar height is described in more detail hereinbelow. Facing the outer housing top 7, the loading platform 4 comprises wheel houses 44, which are integrally formed into the lower portion of the steering columns 42, and a base part 45, which is delimited at the front and back by an upwardly projecting rim 46, so that a loading surface 47 that is secured to prevent the load from sliding is created. The length and width dimensions of the loading platform 4 are selected such that the wheel houses 44 are able to enclose the upwardly projecting wall region 38 of the outer housing top 6, and a receiving compartment 48 for at least one replaceable rechargeable battery 49 that can be inserted in the front for supplying the wheel hub motor with power is formed beneath the base part 45 and the intermediate plate 40.

Figure 13:
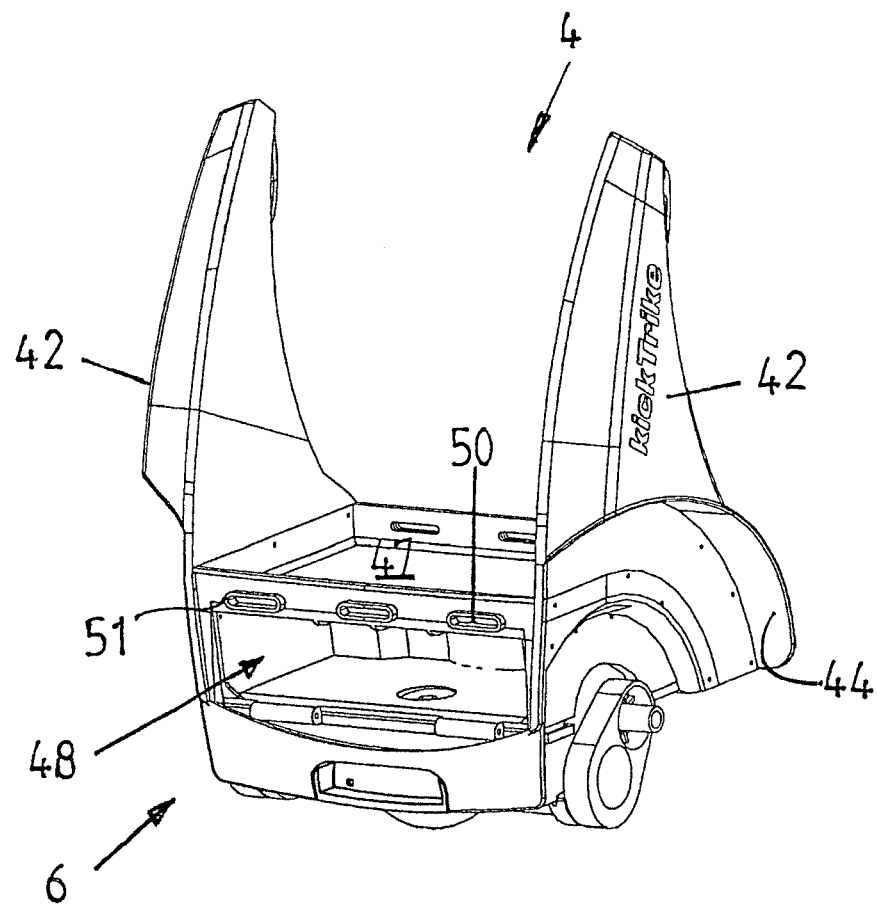
FIG. 13 shows a perspective illustration with the loading platform placed onto the outer housing top.
Figure 14:
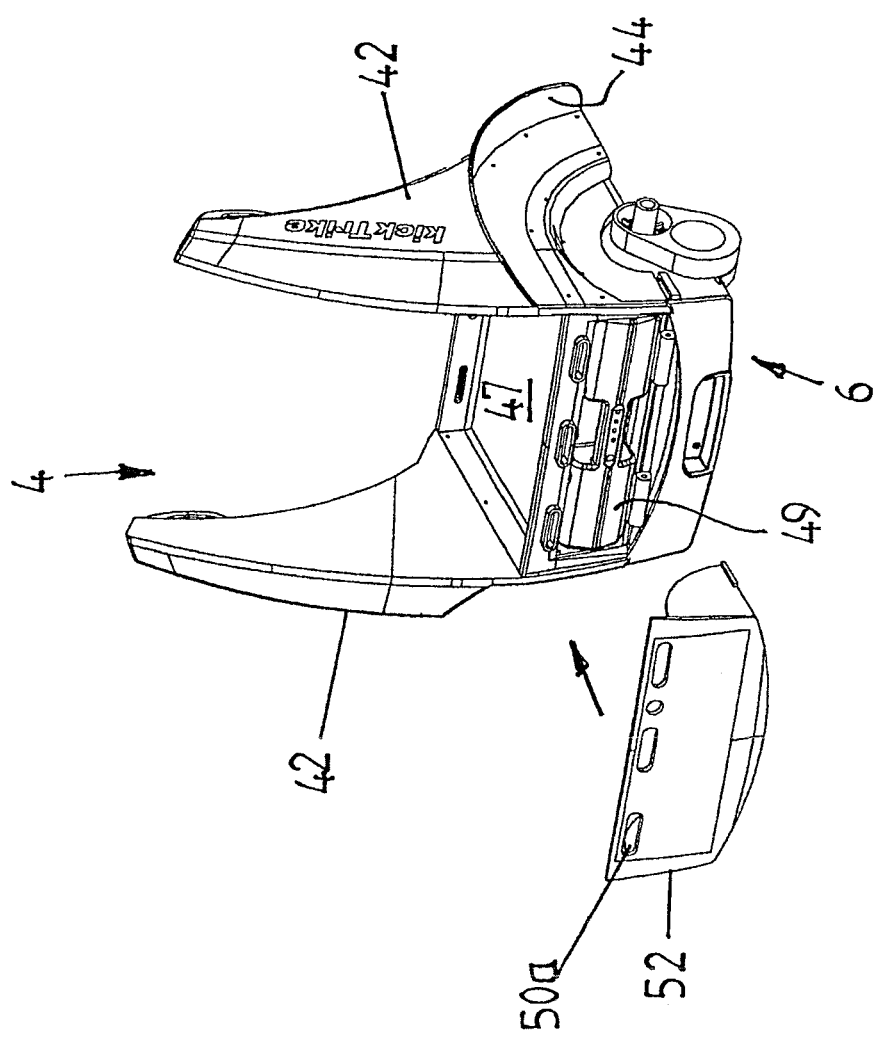
FIG. 14 shows a view according to FIG. 13 comprising a cover panel for the battery compartment.

Openings 50 having upwardly projecting ridges 51 at the front are provided in the upwardly projecting rim 46, and a cover panel 52 having corresponding plug-in openings 50a for covering the receiving compartment 48 can be detachably and pivotably fixed on the ridges. FIG. 13 shows the loading platform 4, which has been plugged onto the outer housing top 6 and FIG. 14 shows the cover panel 52 that has been removed at the front from the ridges 51.

Figure 15:
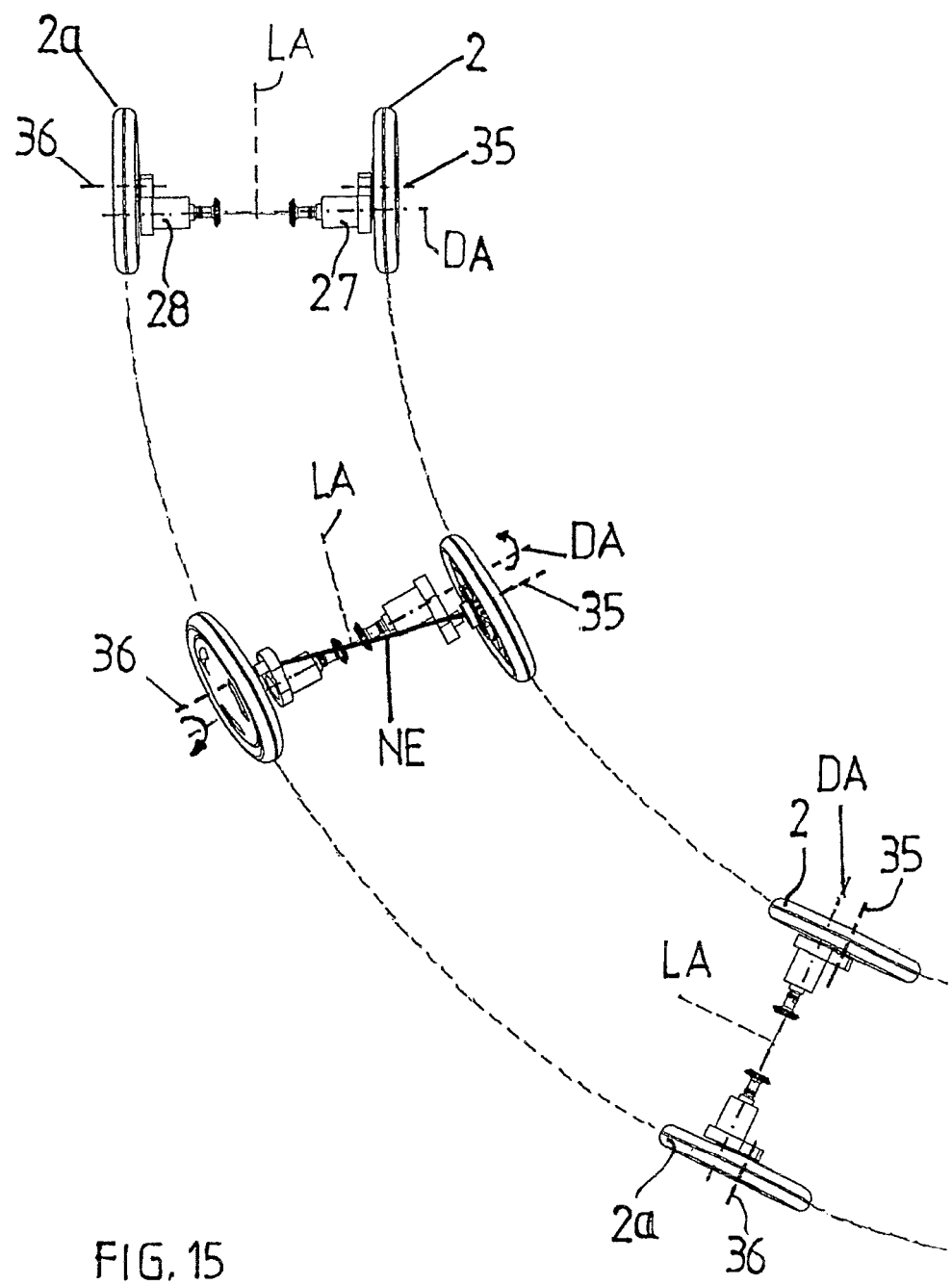
FIG. 15 shows a schematic illustration of the inclination and steering mechanism with a plane of inclination during cornering.

The inclination and steering mechanism of the two front wheels 2 and 2a functions as follows. The steering motion about the steering axle LA is transferred via the steering gearwheel 31 to the contrate gears 29 and 30 by the deflection of the handlebar 5 to the left or right. During the steering motion to the right, for example, the steering gearwheel 31 drives the contrate gear 29 of the axle shaft 27 counterclockwise and it drives the contrate gear 30 of the axle shaft 28 clockwise, which is to say in opposing directions. The axle shafts 27 and 28, together with the wheel axles 35 and 36 thereof, accordingly move forward or back in opposing rotational directions, whereby the wheel axles 35 and 36 are no longer disposed in a horizontal line L in relation to each other and define a plane of inclination NE, whereby the loading platform 4 becomes inclined to the right or the left relative to the roadway (see FIG. 15).

As a result of the steering and inclination mechanism thus formed, the two front wheels 2 are inclined toward the roadway during cornering, whereby the load cart 1 can counteract the centrifugal force acting in the curve. In this way, the loaded load cart 1 can be safely steered in the curve.

Figure 16:
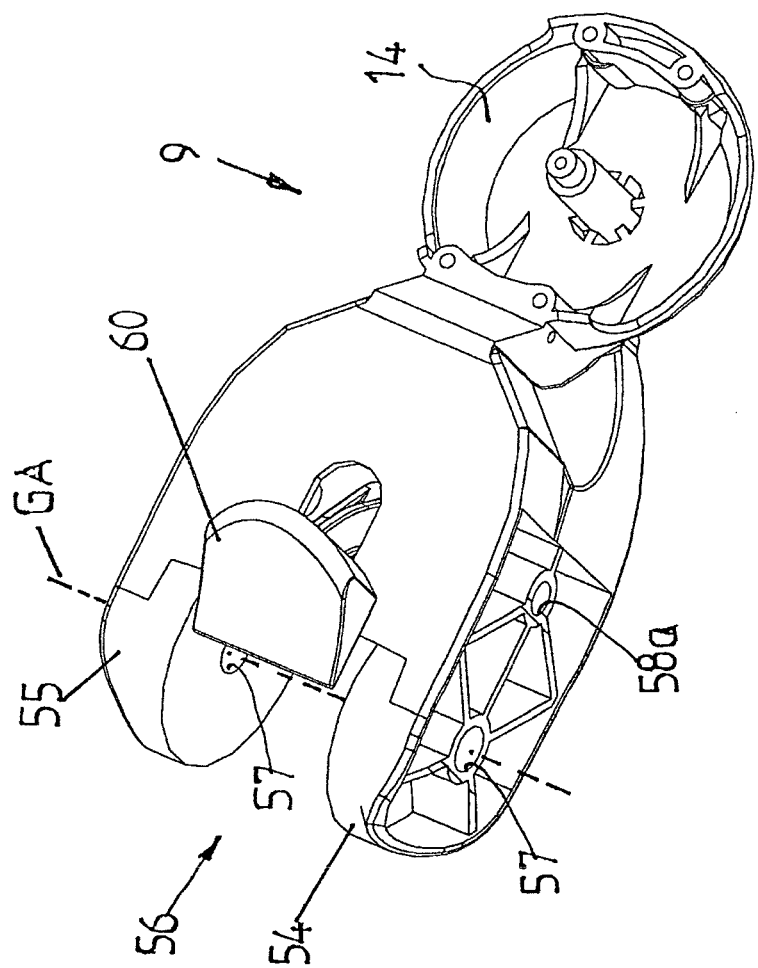
FIG. 16 shows the composition of the inner housing bottom in a top view with an inserted lever.
Figure 17:
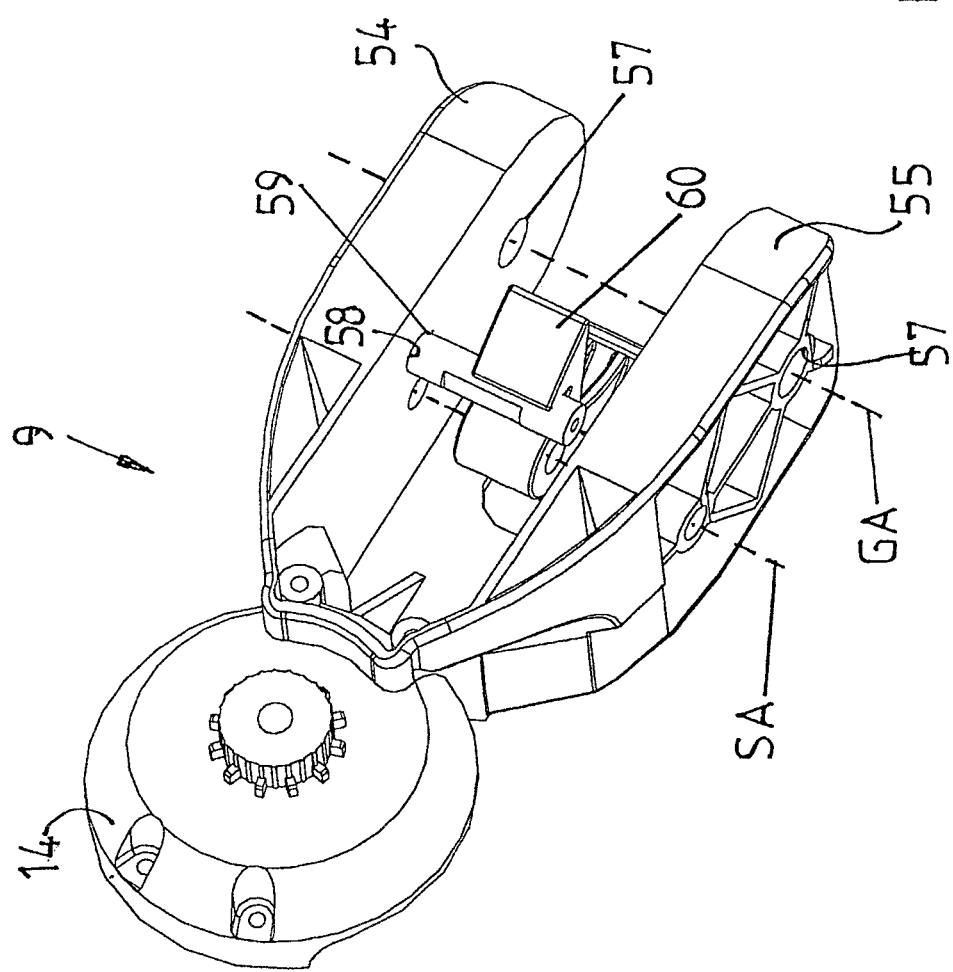
FIG. 17 shows the composition of the inner housing bottom in a bottom view with a lever locked on the splined shaft.

As is shown in FIGS. 16 and 17, the inner housing bottom 9 comprises two U-profile-shaped legs 54 and 55, which are disposed or integrally molded on the shell 14 in the shape of a fork 56.

Mutually aligned openings 57 for receiving the joint axis GA located perpendicularly to the legs 54 and 55 are introduced into the two legs 54 and 55, and an opening 58 for a splined shaft 59 is introduced into one of the legs 54 or 55, the splined shaft likewise being disposed perpendicularly between the legs 54 and 55. This splined shaft 59 is associated with a lever 60, which is pivotably disposed between the legs 54 and 55 and which is mounted about a pivot axis SA in an opening 58a in the legs 54 or 55, wherein the lever 60 securely engages behind the splined shaft 59 or releases the locked connection upon actuation.

The footboard 53, on which the driver stands comfortably with one leg, is connected to the inner housing bottom 9 via a joint axis GA, so that the footboard 53 can be folded up as needed or be disconnected for assembly.

Figure 18:
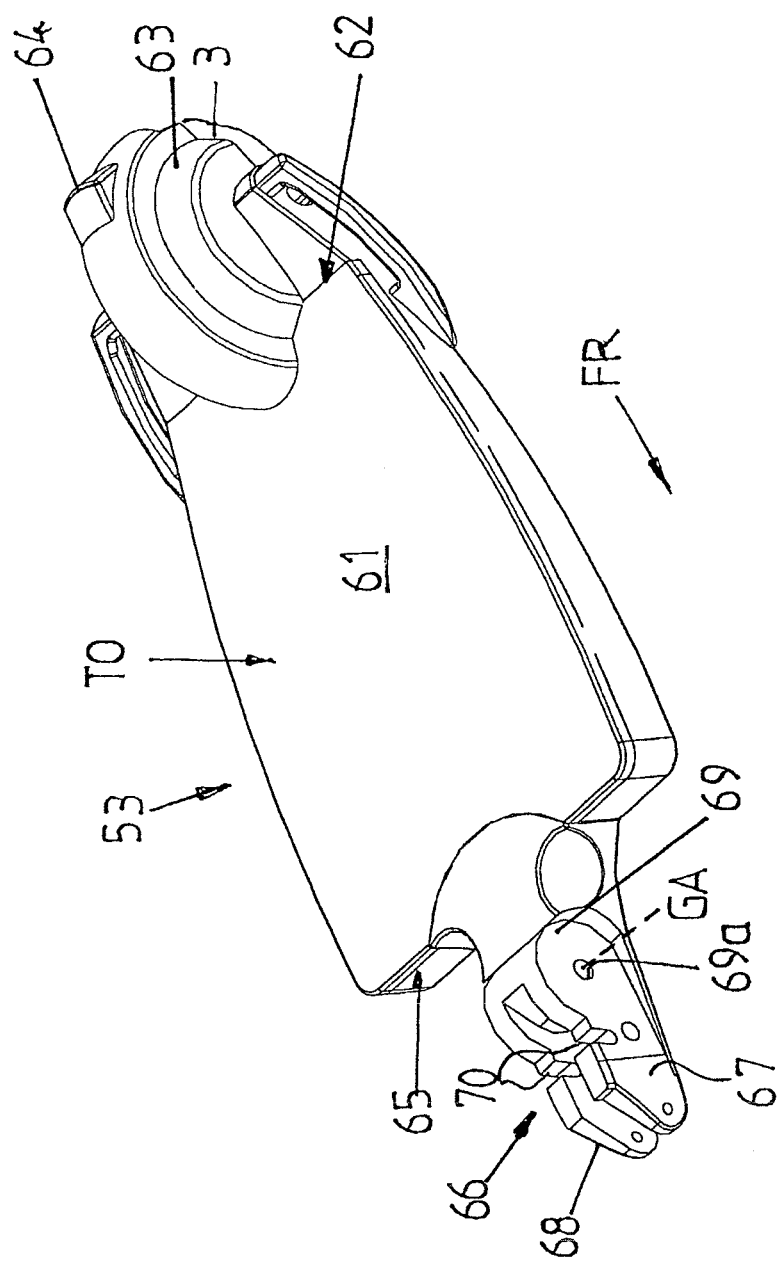
FIG. 18 shows a perspective illustration of the footboard in a top view.

The footboard 53 has a base body 61 (see FIG. 18), at the end 62 of which facing away from the travel direction the rear wheel 3 is mounted, including a wheel hub motor (not shown), wheel house 63 and brake light 64. A connecting element 66, which can be inserted between the legs 54 and 55 of the inner housing bottom 9, is integrally molded onto the end 65 of the base body 61 which is located at the front in the travel direction FR, the connecting element comprising two legs 67 and 68 that are mutually spaced apart and parallel to each other and have a web 69, in which a through-hole 69a is introduced close to the front end 65 of the base body 61. The connecting element 66 is inserted into the space between the legs 54 and 55 until the openings 57 in the legs 54 and 55 are congruent with the through-hole 69a in the web 69 and the joint axis GA can be guided through the openings 7 and the through-hole 69. The footboard 53 can then be folded up about the joint axis GA. To secure the footboard 53 against folding up, open recesses 70 are introduced into the legs 67 and 68 in the direction of the upper footboard face TO, in which the splined shaft 59 will be seated and secured by the lever 60. If the footboard 53 needs to be folded up, the lever 60 is actuated, whereby the splined shaft 59 is released so that the footboard 53 can carry out the desired folding movement.

Folding the footboard 53 up or down can be carried out manually, or by a worm gear mechanism (not shown) that is driven by a motor and operatively connected to the joint axis GA.

Figure 19:
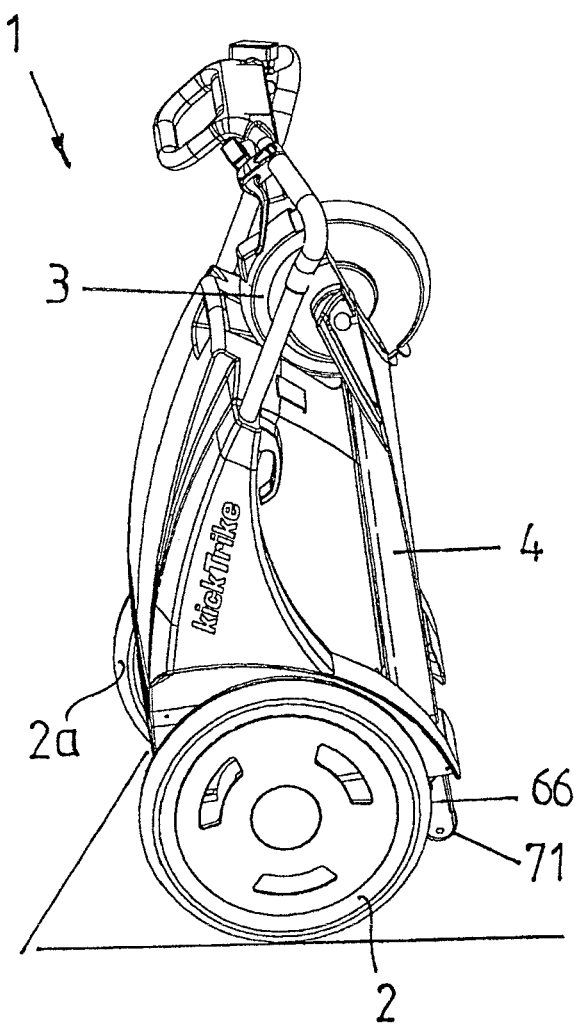
FIG. 19 shows a perspective illustration of the load and/or transport cart according to the invention in the folded-up state.

FIG. 19 shows the load and/or transport cart 1 according to the invention in the folded-up state. So as to increase the stability of the load and/or transport cart 1 according to the invention, a roller 71 is rotate mounted at the front end of the legs 67 and 68 of the connecting element 66. This ensures a three-point bearing of the front wheels 2 and 2a with the roller 71.

Figure 20:
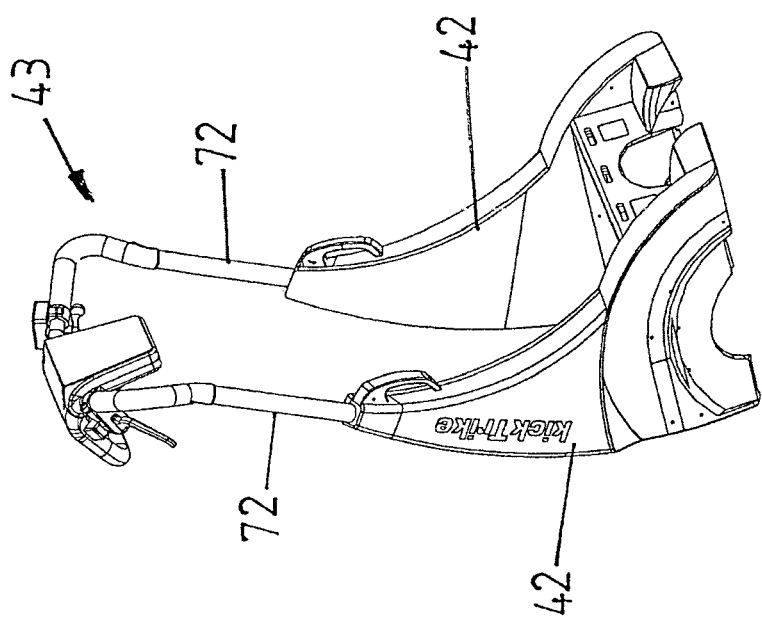
FIG. 20 shows an illustration of the handlebar at the steering columns of the loading platform.
Figure 21:
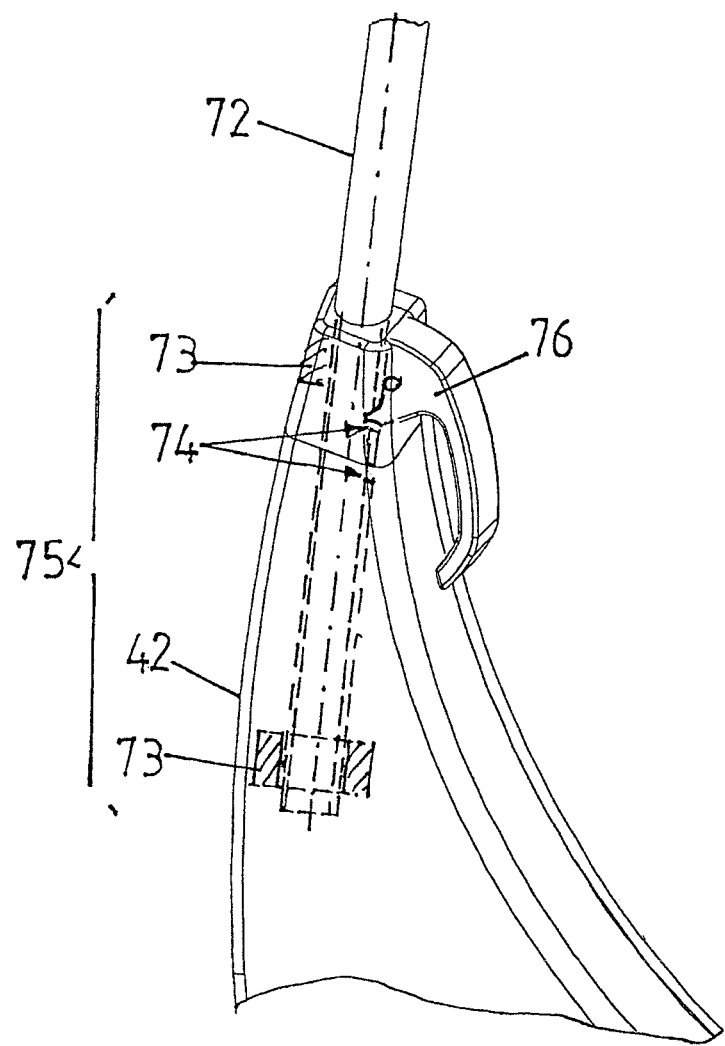
FIG. 21 shows a schematic illustration of the mechanism for adjusting the handlebar height.

The arrangement of the handlebar 43 at the steering columns 42 is apparent from FIG. 20. The two handlebar pipes 72 are integrated into the steering columns 42 so as to be height-adjustable. At least two pipe-section-like guide segments 73, which are disposed on top of each other and made of metal, are provided for this purpose, into which the handlebar pipes 72 are inserted. As is shown schematically in FIG. 21, the jacket of the handlebar pipes 72 has at least two openings 74, which are situated vertically at a distance from each other and located at the desired height. A respective adjusting mechanism 75 is provided in the upper region of the steering columns 42 for clamping and releasing the adjusted height of the handlebar pipe, the grip 76 of the mechanism being used to move a locking pin 77 into and out of the opening 74 of the handlebar pipe 72.

Figure 22:
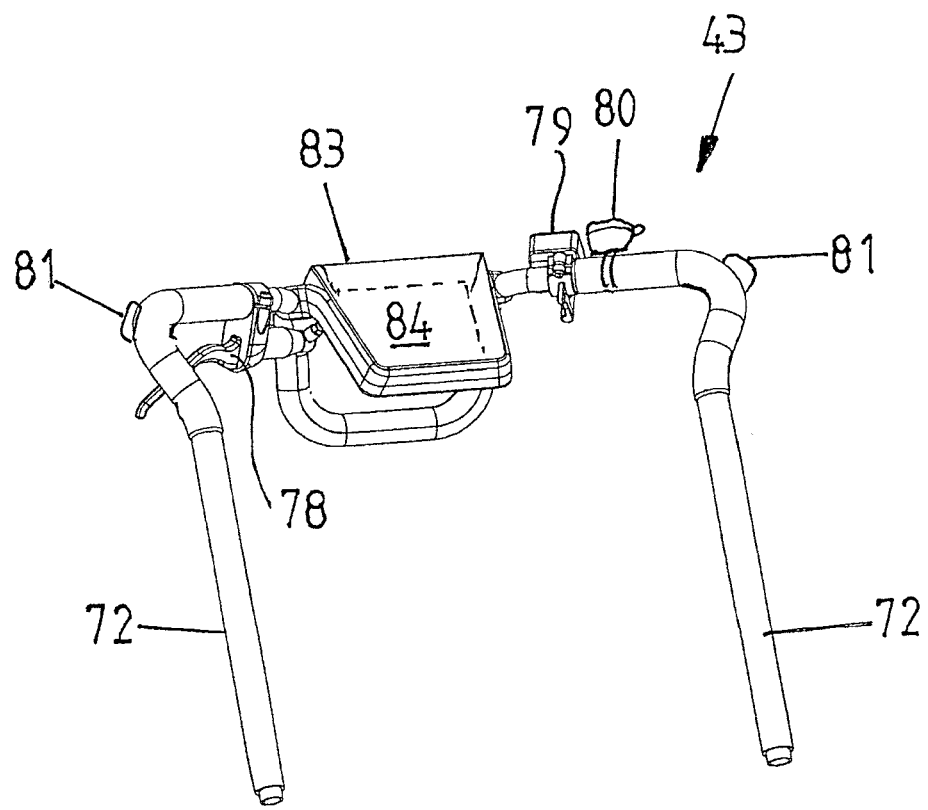
FIG. 22 shows a perspective illustration of the handlebar from the driver's side.
Figure 23:
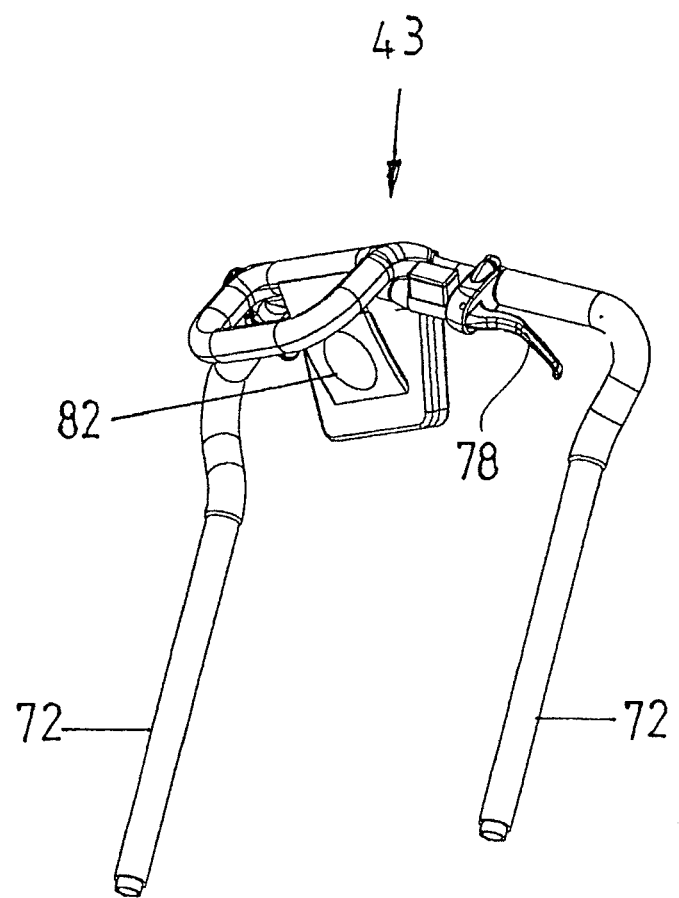
FIG. 23 shows an illustration of the handlebar from the front.

As is further apparent from FIG. 22, the handlebar 43 is provided with a device 78 for actuating a brake, which is not shown, at the front wheels 2 and 2a, a device 79 for accelerating, by way of which the power demand of the wheel hub motor installed as the drive system at the rear wheel 3 can be regulated, a bell 80 or a horn, an indicator light 81, headlight 82 (see FIG. 23), and a dashboard 83. The dashboard 83 comprises a compartment 84 having a transparent cover for accommodating a communication device in a water-proof manner and reading the same, such as a smart phone or iPhone, a connection for charging the telecommunications device, a display device for the charge state of the battery, and a speed indicator (see FIGS. 22 and 23).

Figure 24:
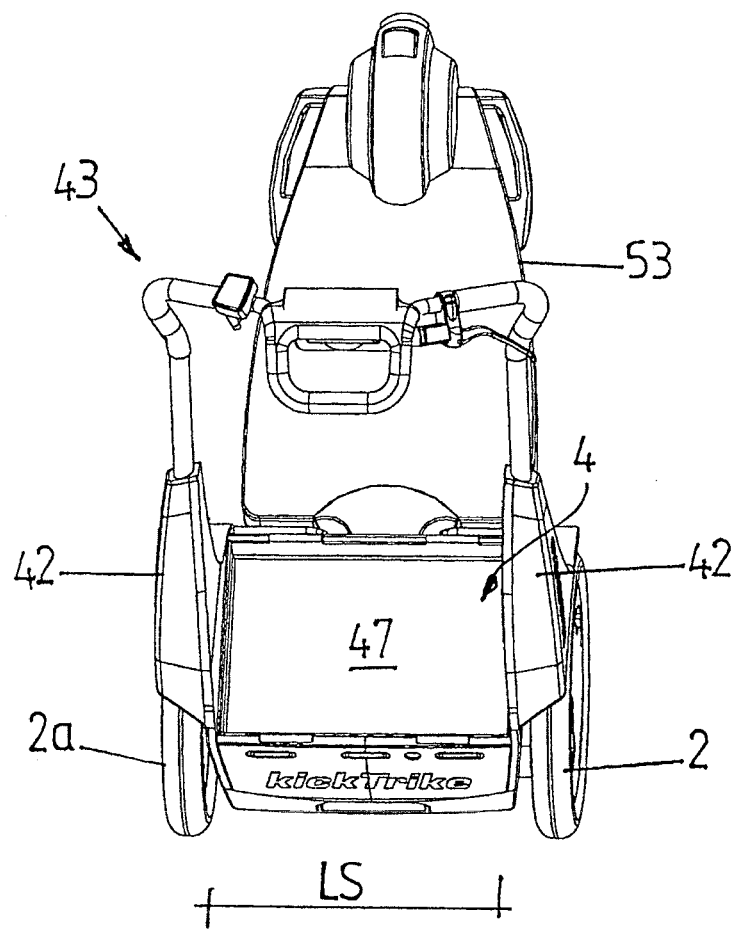
FIG. 24 shows an illustration of the loading surface in a top view without a transport container.

FIG. 24 shows the position of the loading surface 47 of the loading platform 4, the longer side LS of which is disposed transversely to the travel direction and the base of which has an inclination of 5° toward the rear counter to the travel direction.

Figure 25:
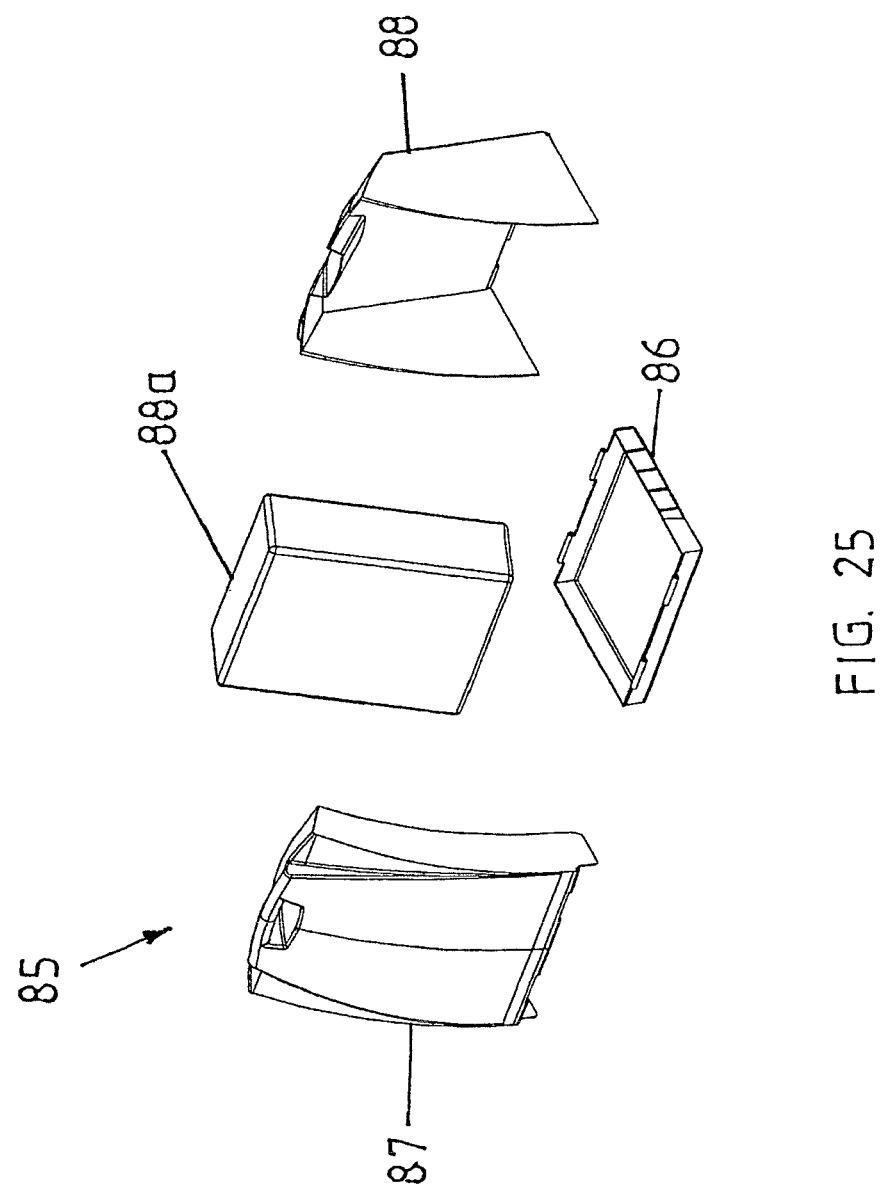
FIG. 25 shows an exploded view of the transport container.

An appropriately adapted, separately transportable transport container 85 comprising transport goods 85a (see FIG. 25) can be placed on the loading surface 47 of the loading platform 4, the container being formed of a base part 86, a front part 87 and a back part 88. The front part 87 and back part 88 are hinged to the base part 86 by way of integral hinges, which are not shown, and can thus be opened, wherein the opening angle between the front part 87 and the back part 88 is dimensioned so that a maximum of three beverage crates can be stacked on top of each other. The front part 87 and the back part 88 can be connected by a flexible strap, the length of which is adjustable, to ensure a secure position of the transported goods.

Figure 26:
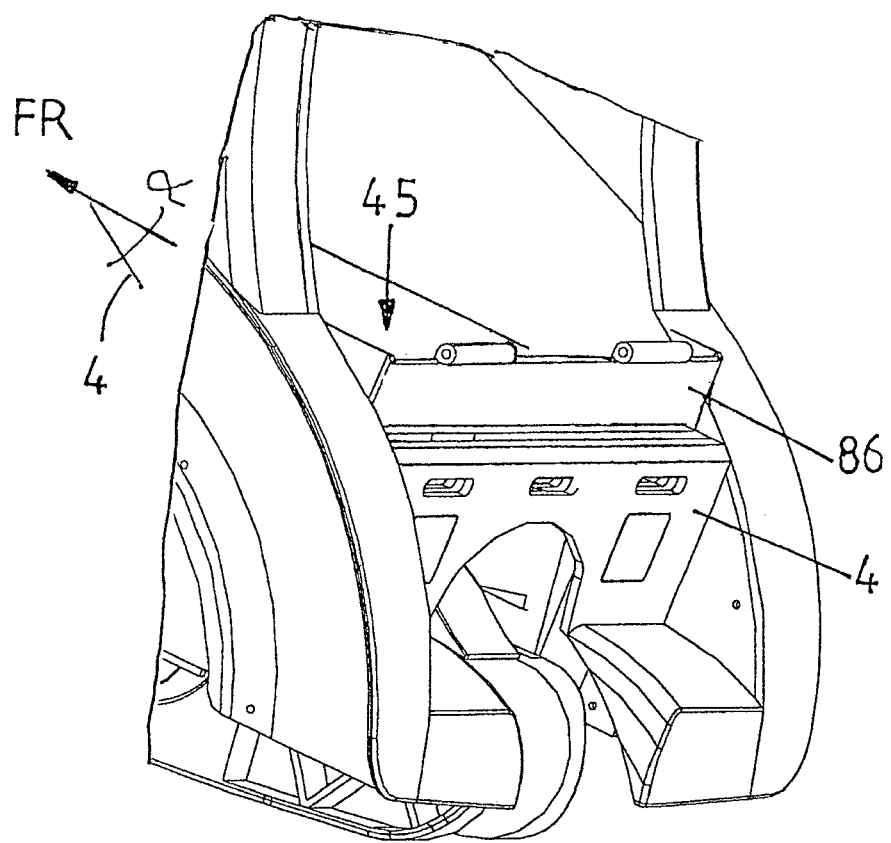
FIG. 26 shows a detail for retaining the transport container on the loading surface.

So as to retain the transport container 85 securely in a way that prevents sliding, a detent mechanism 89 is integrated into the upwardly projecting rim 46 of the base part 45 of the loading platform 4, the catch lug 90 of the mechanism engaging with a spring-loaded rocker 91 in a detent opening 92 introduced into the base part 86 in a securing manner, or being designed so as to be movable out of this opening upon actuation of the rocker 91 (see FIG. 26).

Figure 28:
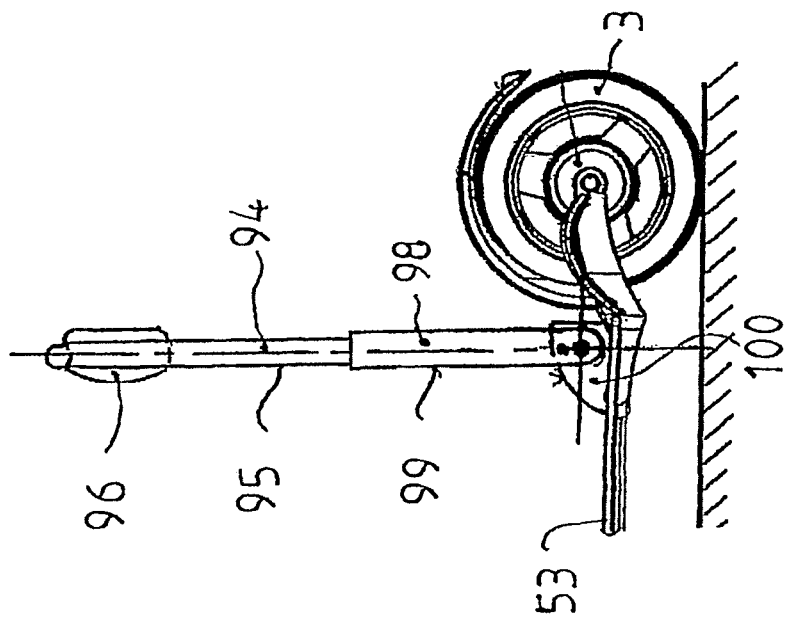
FIG. 28 shows a sectional illustration of the footboard with a folded standing seat.
Figure 27:
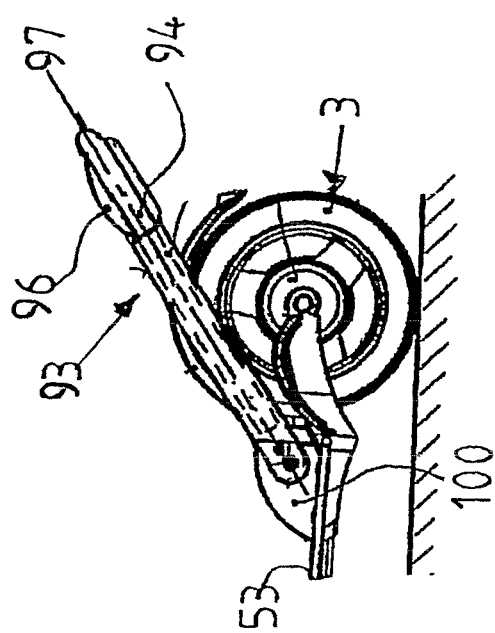
FIG. 27 shows a sectional illustration of the footboard with a folded-down standing support.

If the travel distance is long, it is advantageous to provide a foldable and height-adjustable standing seat 93 for the driver. FIG. 27 shows a detail of the standing support 93 in the folded-down state, and FIG. 28 shows it in the folded-up state.

The standing seat 93 is composed of two legs 94 and 95 of a U-shaped arch 97 comprising a backrest 96 at the center, and two tubular rods 98 and 99, in which the legs 94 and 95 are inserted without play and adjustable and fixable in terms of their height. The tubular rods 98 and 99 are rotatably mounted in bearing brackets 100, which are rigidly installed on the footboard 53, wherein the tubular rods 98 and 99 can be locked in the vertical position and in the folded-up position, for example by a spring and bolt system. As an alternative to the backrest 96, it is also possible to install a saddle for the seat.

A preferred drive concept for the load and/or transport cart 1 according to the invention provides for the rear wheel 3 to be driven by a wheel hub motor. However, it is also possible to drive each of the front wheels 2, 2a by a wheel hub motor and to design the rear wheel 3 as a swivel wheel, or to drive all the wheels directly by wheel hub motors. It goes without saying that the axle shafts 27 and 28 for the front wheels 2, 2a must be designed and adapted accordingly. This, however, does not imply a departure from the invention.

All essential assemblies in Exemplary Embodiment 1 of the load and/or transport cart 1 according to the invention, such as the footboard 53, the loading platform 4, the outer housing bottom 7, the outer housing top 6, the inner housing top 8, and the inner housing bottom 9, are injection-molded parts made of impact-resistant plastic material or cast metal.

Exemplary Embodiment 2

The load and/or transport cart 1 described in more detail in the following example differs from that of Example 1 only in that the main assemblies are made of sheet metal. The reference numerals of Example 1 remain for those components that are not modified.

Figure 29:
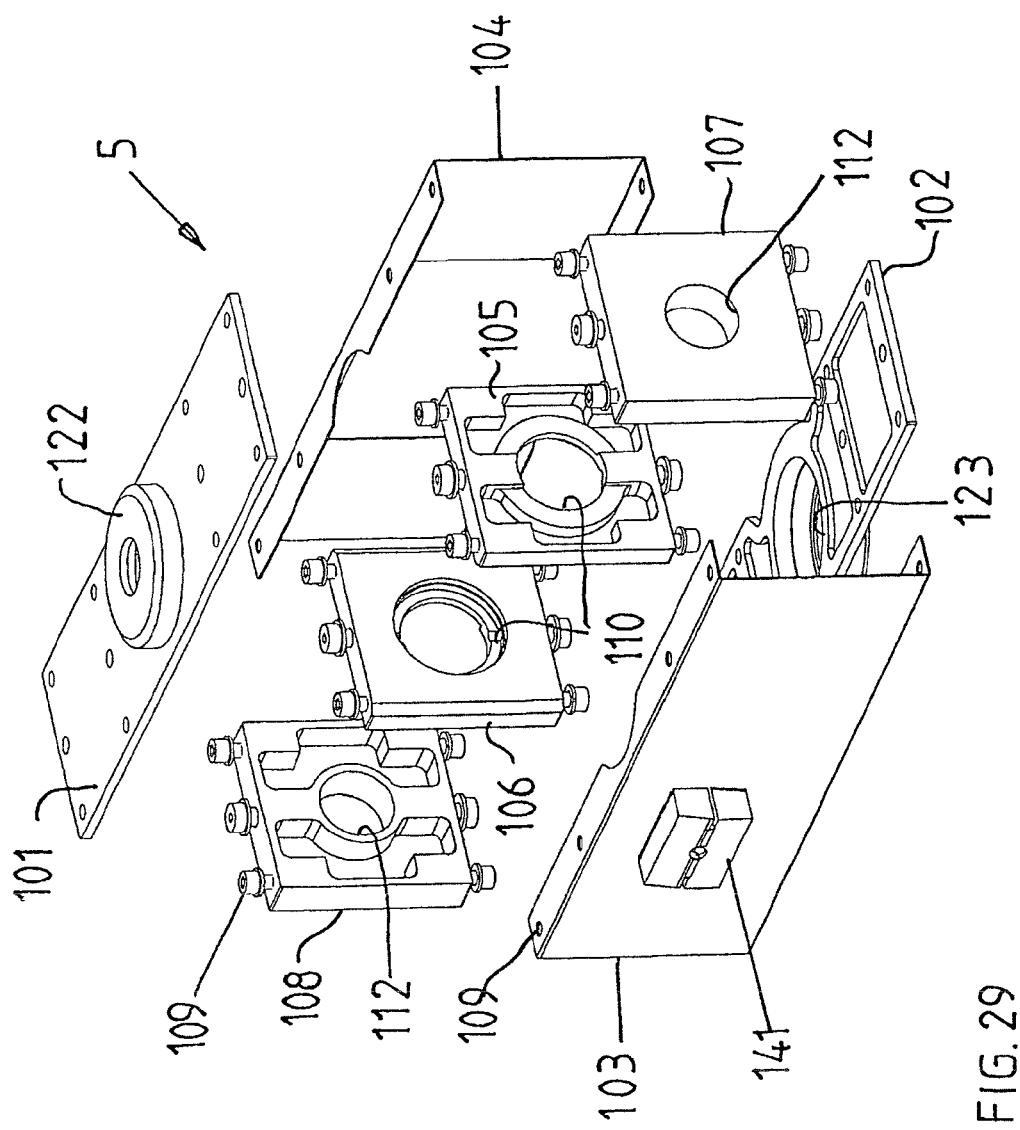
FIG. 29 shows an exploded view of the cuboid gearbox housing in sheet metal design.

FIG. 29 shows the cuboid gearbox housing 5, which is composed of an upper gear plate 101, a lower gear plate 102, a plate 103 located at the front in the travel direction, and a rear plate 104 facing away from the travel direction, and inner and outer bearing shells 105, 106, 107 and 108. The upper gear plate 101, the lower gear plate 102, the front plate 103, the rear plate 104 and the bearing shells 105 to 108 are joined to the gearbox housing 5 by way of screw connections 109.

Figure 30:
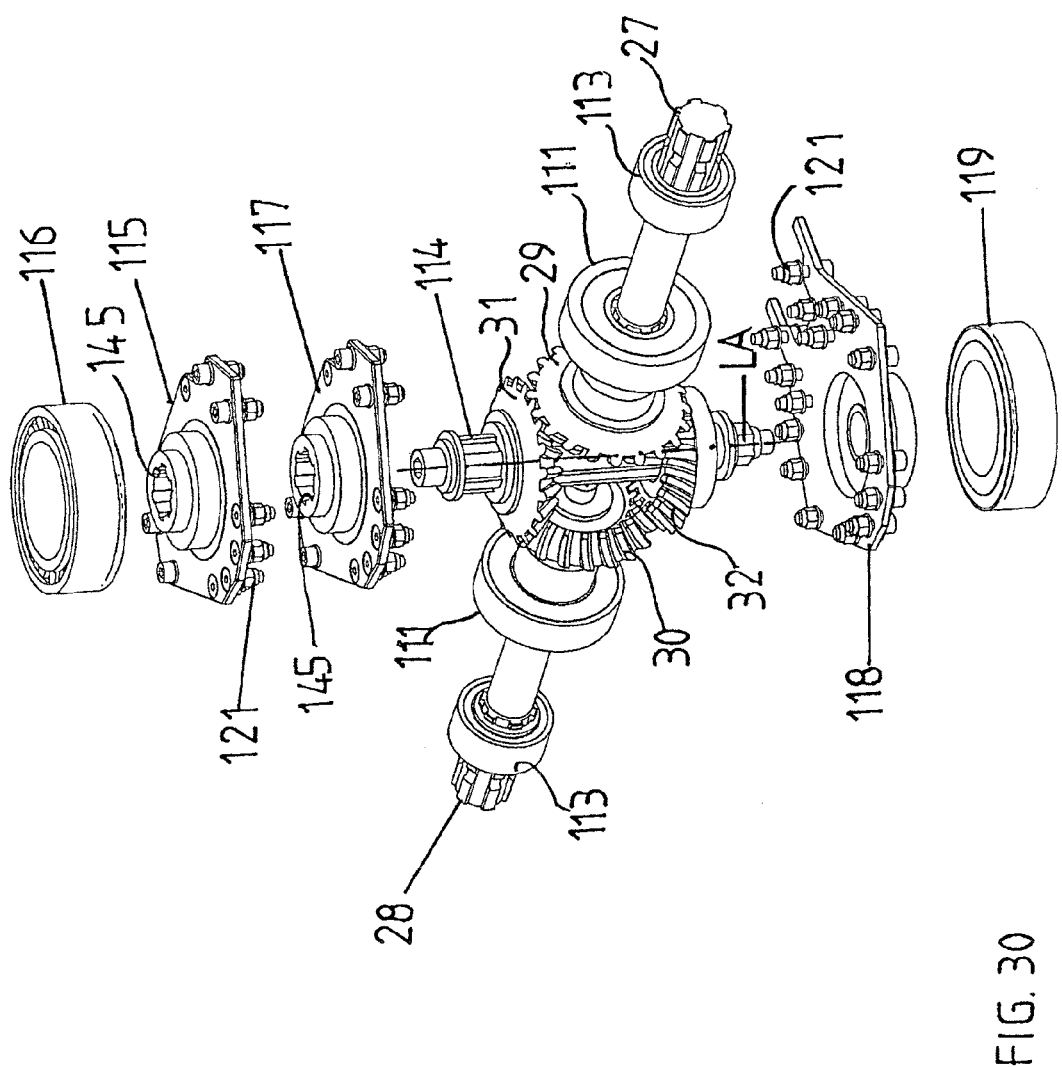
FIG. 30 shows an exploded view of the steering gearwheel, compensating gearwheel, contrate gears, axle shafts and bearing plates.

As is shown in FIG. 30 in conjunction with FIG. 29, each axle shaft 27 or 28 carrying a rotationally fixed contrate gear 29 or 31 is associated with an inner bearing shell 105 or 106 and an outer bearing shell 107 or 108. The inner bearing shells 105 or 106 comprises a bearing seat 110 for a respective angular ball bearing 111, and the outer bearing shells 107 or 108 comprise a bearing seat 112 for a needle bearing 113, between which the axle shaft 27 or 28 for carrying out the steering motion is rotatably accommodated.

The steering axle LA is guided in a hollow shaft 114 in a rotationally fixed manner. The hollow shaft 114, in turn, is fixed in the steering gearwheel 31 and the compensating gearwheel 32, wherein a tapered roller bearing 116, disposed on a first upper bearing plate 115, and a second upper bearing plate 117 are associated with the steering gearwheel 31, and a further tapered roller bearing 119 disposed on a lower bearing plate 118 is associated with the compensating gearwheel 32.

Figure 31:
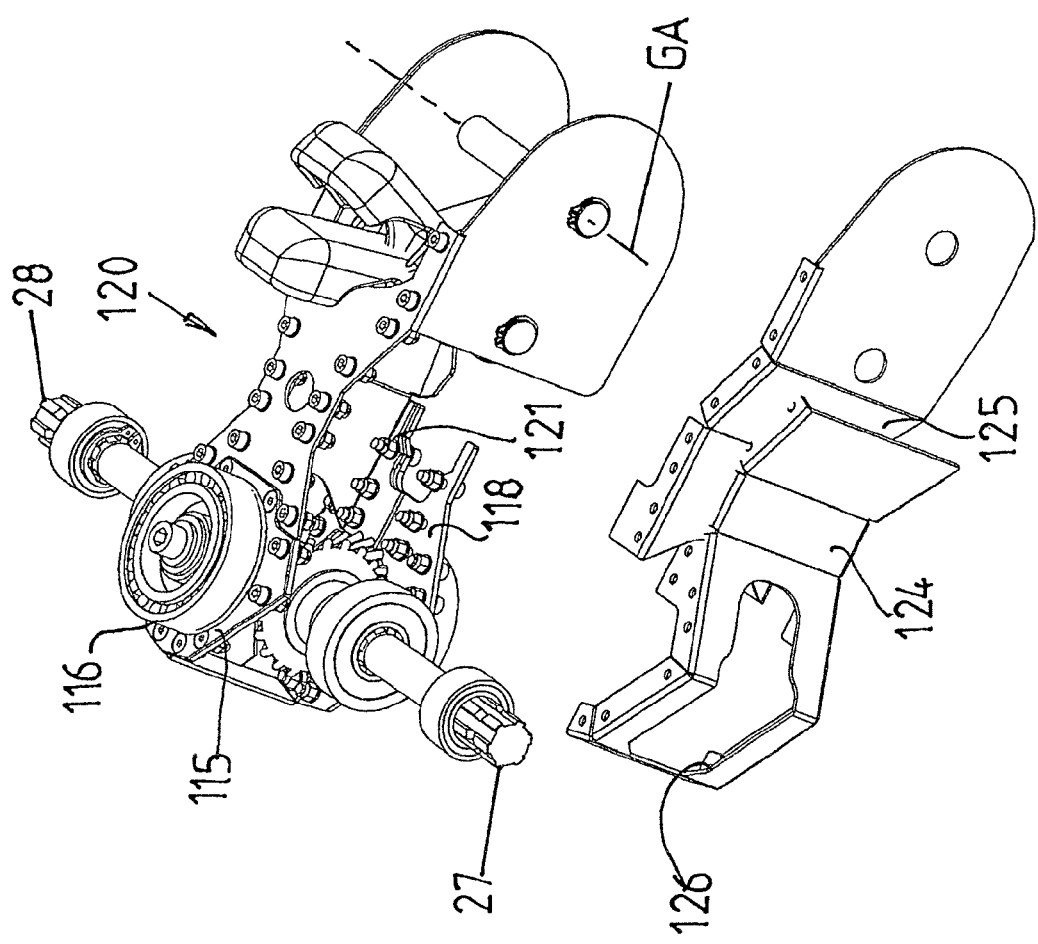
FIG. 31 shows a perspective illustration of the gearbox comprising a fork mount that is opened on the side.

By way of screw connections 121, the bearing plates 115, 117 and 118 are attached to a fork mount 120, which vertically encloses the contrate gears 29, 31 and the steering gearwheel 31 and compensating gearwheel 32 on the outside, parallel to the steering axle direction (see FIG. 31).

The upper tapered roller bearing 116 is seated in a molded extension 122 of the upper gear plate 101, and the lower tapered roller bearing 119 is seated in a recess 123 of the lower gear plate 102, so that the steering axle LA is vertically securely guided.

The fork mount 120 is formed, for example, of two receiving panels 124 and 125, which are attached to each other and are bent several times in the contour of the bearing plates 115, 117 and 118, of which the receiving panels 124 in each case have a cut-out 126, which extends horizontally approximately centrally in the plane of the axle shafts 27 or 28 and through which the axle shafts 27 or 28 can be guided in the direction of the wheel axles 35 or 36 and can carry out a horizontal pivoting movement upon actuation of the handlebar. The receiving panels 125 form the legs 54 and 55 of the fork mount 120, which—as was already described in paragraph hereinabove—are connected to the footboard 53 via the joint axis GA so as to be able to fold up.

Figure 32:
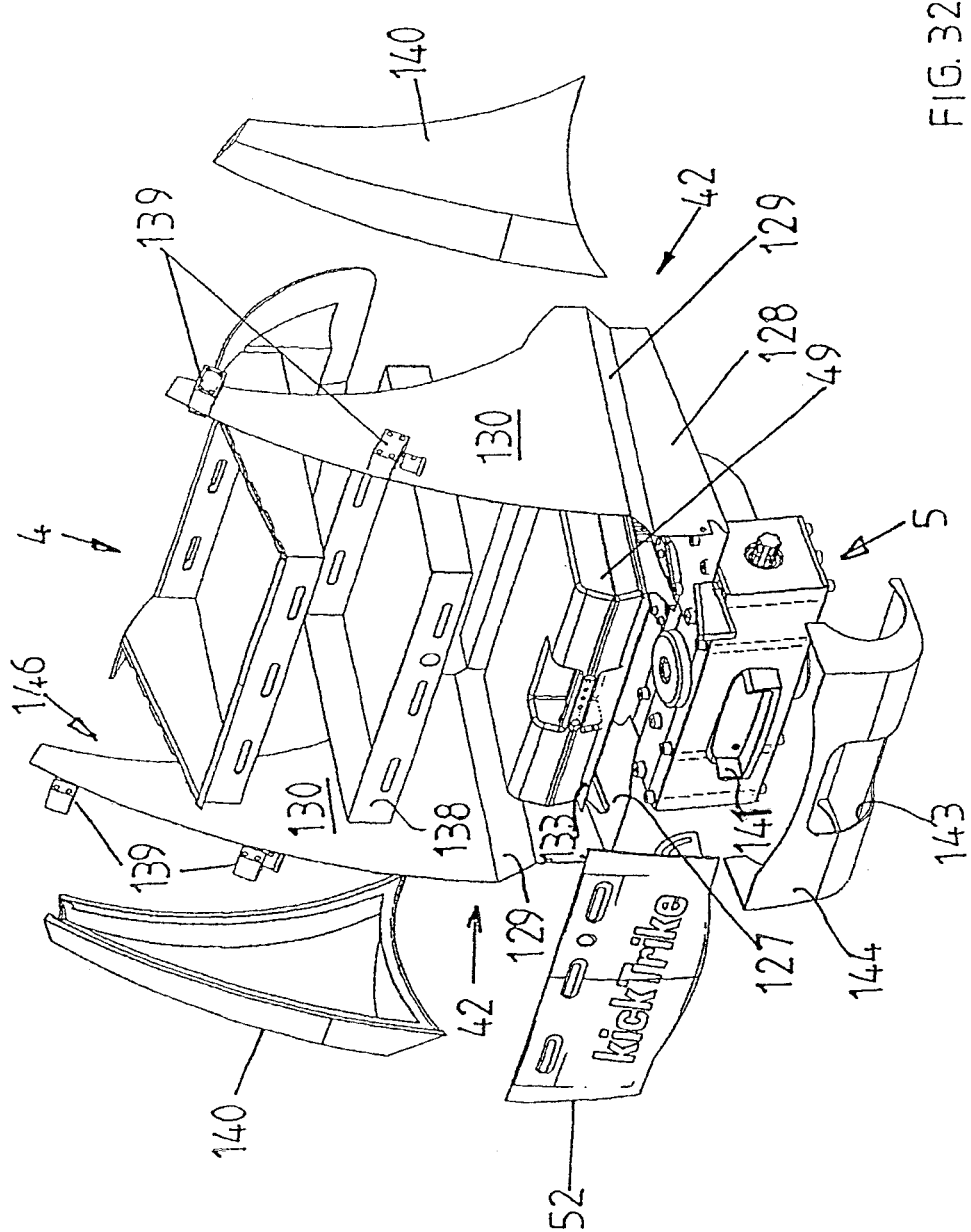
FIG. 32 shows an exploded view of the front region of the load and/or transport cart according to the invention comprising a loading platform in sheet metal design.

FIG. 32 shows an exploded view of the composition of the front region of the load and/or transport cart 1 comprising the loading platform 4, steering columns 42, battery 49 and gearbox housing 5. The two steering columns 42 are composed of a cut sheet metal piece 146, which is bent multiple times and is formed of a base leg 124 facing the upper gear plate 101, an outer wall section 128 projecting perpendicularly upward from the base leg 127, a wall part 129 projecting obliquely away from the wall section 128, and a side wall part 130 projecting perpendicularly upward from the latter.

Cut-outs 131 for the molded extension 122 are worked into the base leg 127.

Figure 33:
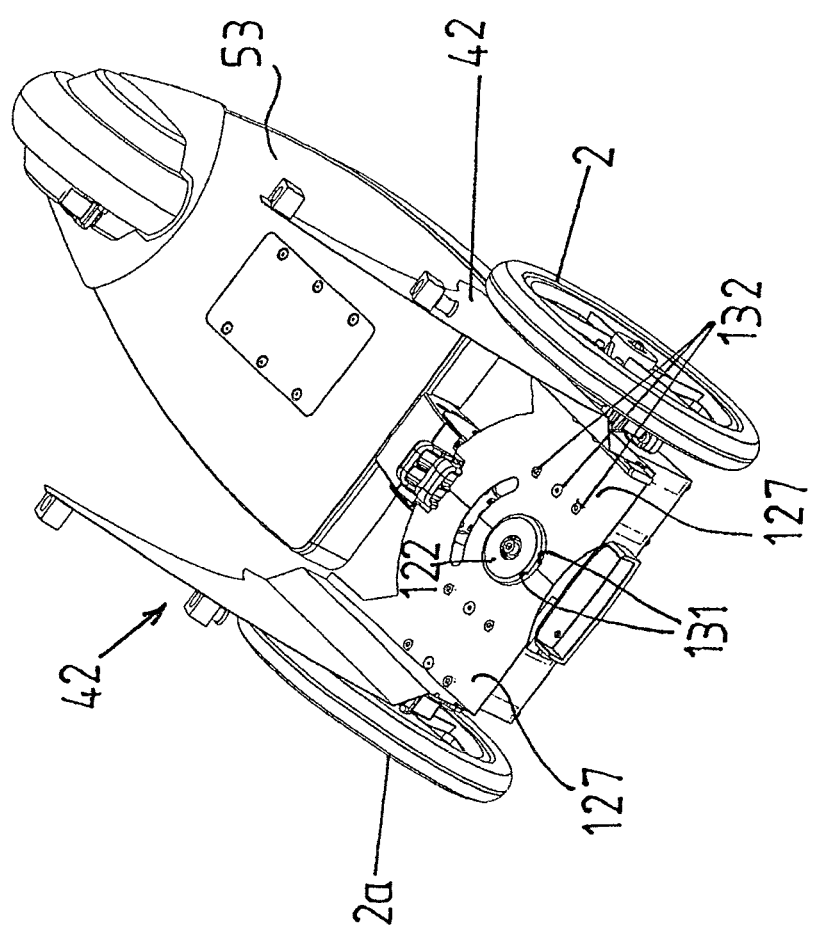
FIG. 33 shows a perspective top view onto the steering columns that are attached to the upper gear plate in sheet metal design.

As is apparent from FIG. 33, the base legs 127 are fixed directly to the upper gear plate 101 by way of screw connections 132.

Figure 34A:
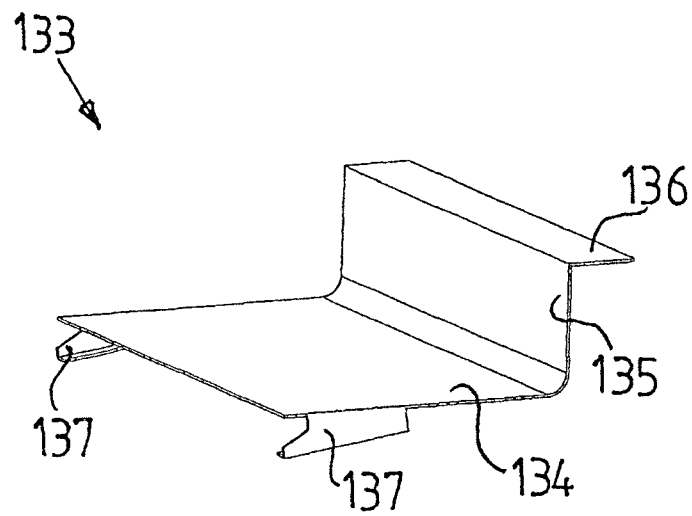
FIG. 34a shows an illustration of the support panel for the replaceable battery.
Figure 34B:
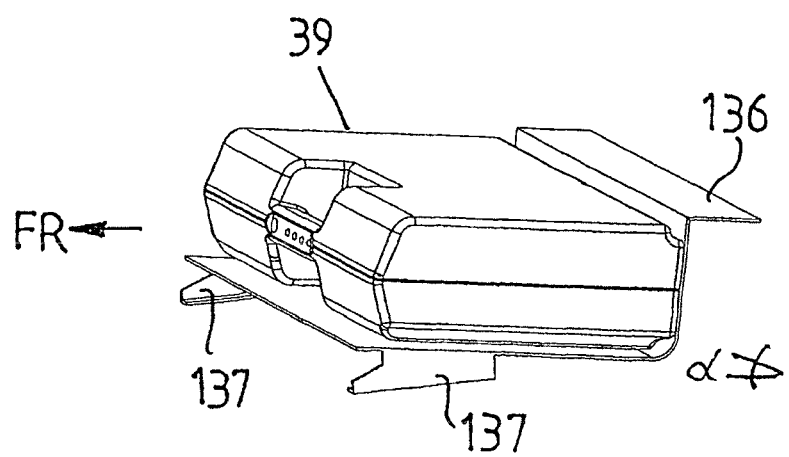
FIG. 34b shows an illustration of the support panel with the replaceable battery placed thereon.

Further referencing FIG. 32, an angled panel 133 is disposed on the base leg 127, the angled panel comprising an approximately horizontal wall part 134 for supporting the battery 49, a rear wall section 135 projecting perpendicularly from the wall part 134 as a stop for the battery 49, a wall section 136 extending horizontally from the rear wall section 135 in the direction of the footboard 53, and retaining sections 127 that are bent obliquely inward in the direction of the base leg 127 at the front horizontal wall part 134 (see FIG. 34a). The retaining sections 137 are supported on the base leg 124 and are latchingly engaged in such a way that the battery 49 seated on the wall part 134 assumes a position that is slightly inclined in the travel direction and corresponds to the inclination of the loading platform 4 (see FIG. 34b). The angle of inclination α is approximately <5°.

A box-shaped base part 138 is disposed and attached above the battery 49 along the obliquely outwardly projecting wall part 129. The likewise box-shaped loading platform 4, which assumes a slightly rearwardly inclined position of <5°, for example, in relation to the driving direction FR, is likewise located in the box-shaped base part 138. Dimensioning of the loading platform is discussed hereinabove.

The receiving compartment 48 for the replaceable battery 49 is located between the base part 138 and the wall part 134. The receiving compartment 48 can be closed or opened by the cover panel 52 that is pivotable in the travel direction FR.

Holders 139 for the attachment of the handlebar pipes 72 of the handlebar 43 are provided in the upper region of the upwardly projecting side wall parts 130 of the steering columns 42. The side wall parts 130, together with the holders 139 thereof, are covered by appropriately shaped cover panels 140.

A mounting 141 for a prop 142 for propping the load and/or transport cart 1 when the footboard 53 is folded up are provided on the front plate 103 of the gearbox housing 5. When not used, this prop 142 is horizontally inserted in a recess 143 of a front cover 144 that is attached to the gearbox housing 5 and can be moved vertically out of the recess 143 to support the load and/or transport cart 1. This is shown in FIG. 35.

The invention claimed is:

1. A load and transport cart in the form of a kick scooter, comprising at least three wheels including two front-wheels and at least one rear wheel, a handlebar, a loading platform, and a footboard that can be folded up and locked, wherein the two front wheels are operatively connected to a steering and inclination mechanism for absorbing centrifugal force during cornering, the handlebar is connected to the loading platform via at least one steering column, and a receiving compartment for a rechargeable battery is provided beneath the loading platform, wherein a horizontal dimension of the loading platform is greater than a horizontal dimension of the loading platform in a rectilinear travel direction of the cart and is disposed transversely to the rectilinear travel direction and is at least one of rearwardly inclined or displaceable counter to the rectilinear travel direction, and the receiving compartment comprises an opening at the front of the cart for receiving the rechargeable battery.

2. The load and transport cart according to claim 1, wherein the steering and inclination mechanism comprises two axle shafts which are coaxially aligned on a first rotational axis and each have a rotationally fixed contrate gear, the contrate gears are operatively connected to each other in a meshing manner via a steering gearwheel and a compensating gear wheel that are disposed perpendicularly to the rotational axis, wherein each axle shaft is provided with respective wheel axles for the respective front wheels, the wheel axles are coaxially aligned on a second rotational axis parallel to and spaced from the first rotational axis, and the steering gearwheel and the compensating gearwheel are axially coincident with a vertical steering axis, the steering gearwheel is nonrotatably fixed coaxially with the steering axis for transferring steering motion, and the compensating gearwheel is rotatably mounted coaxially with the steering axis, so that each of the contrate gears together with the axle on which it is mounted carry out a rotational movement opposite a rotational movement carried out by the other contrate gear together with the axle shaft on which the other contrate gear is mounted during a steering motion, and the wheel axles define a plane of inclination for the loading platform.

3. The load and transport cart according to claim 1, wherein the inclination and steering mechanism is accommodated in a gearbox housing that is made from multiple pieces joined in a force-fit manner and each of the pieces is comprised of injection molded plastic, cast metal, or sheet metal, and wherein the steering axle is coupled to the footboard by way of a fork or a fork mount.

4. The load and transport cart according to claim 3, wherein the gearbox housing is made of injection molded plastic or east metal and comprises:

a) an outer housing bottom, which is molded or cast in an axial direction of the axle shafts and has an at least partially hemispherically shaped recess for a lower radial ball bearing;

b) an inner housing bottom, which is disposed perpendicularly to the axle shafts and extends with U-profile-shaped legs in a direction of the footboard, and a hemispherical shell which is seated in the hemispherical recess of the outer housing bottom and carries a centrally vertically projecting first shaft stub comprising a steering axle extending along the steering axis in a rotationally fixed manner and around which shaft stub the compensating gearwheel is rotatably mounted, and wherein the first shaft stub penetrates the hemispherical shell and is guided into the lower radial ball bearing to absorb steering motion;

c) a hemispherically shaped shell of an inner housing top which is placed on the shell of the inner housing bottom and which comprises a second shaft stub which extends in a direction of the first shaft stub and is rigidly fixed to the shell and on which the steering gearwheel is rigidly fixed for transferring the steering motion and which penetrates the hemispherical shell of the inner housing top and is guided into an upper radial ball bearing to absorb the steering motion, the first and the second stub shafts comprise a steering axle extending along the steering axis, the upper radial ball bearing and the second shaft stub are covered by a steering axle cover; and d) an outer housing top, which is placed on the inner housing top and has a base comprising an opening and on which an intermediate plate having an opening that corresponds to the opening in the base is inserted, in which the second shaft stub extends in a freely rotating manner into the steering axle cover.

5. The load and transport cart according to claim 2, wherein the receiving compartment is disposed above the inner housing top, wherein the receiving compartment is formed by a space defined by an upwardly projecting wall region and the base of the outer housing top as well as a lower region of the loading platform, two steering columns are provided and height of the handlebar can be adjusted on, and the handlebar can be locked on, the steering columns at a selected height by way of a clamping and locking mechanism.

6. The load and transport cart according to claim 3, wherein the outer upper housing top is provided with a perpendicularly projecting, peripheral wall region that is open at a front, over which the loading platform, together with housing for the front wheels, the housing being affixed to the steering columns, are placed and fixed so that, during a steering motion of the handlebar, the outer housing top and the outer housing bottom, together with the loading platform, pivot about the steering axis, the steering axis being coaxial with the opening in the base of the outer housing top and the opening in the intermediate plate.

7. The load and transport cart according to claim 1, wherein there are two steering columns, pipe-section-shaped guide segments made of metal for inserting pipe ends of the handlebar are provided in the steering columns, wherein at least two openings located vertically at a distance from each other are provided in a wall of the handlebar pipe for adjustment of height of the handlebar, and a mechanism for clamping, locking and releasing the handlebar pipe is disposed adjacent each of the steering columns, the mechanism comprising a pivotable grip which moves a locking pin into one of the openings in the handlebar pipe for locking or which moves the locking pin out of the opening for releasing.

8. The load and transport cart according to claim 4, further comprising a gearbox housing made of sheet metal and comprising:
   a) a lower gear plate having a recess for a lower tapered roller bearing accommodating the steering axle;
   b) an upper gear plate having an integral extension for an upper tapered roller bearing accommodating the steering axle;
   c) a fork mount which vertically encloses the contrate gears, the steering gearwheel, the compensating gearwheel, and a steering axle on the outside parallel to the steering axle direction and is formed of receiving panels and which has two upper bearing plates attached thereto and a lower bearing plate having axial guides for a shaft comprising the steering axle on which the steering gearwheel and the compensating gearwheel are non-rotatably disposed, wherein the receiving panels of the fork mount have horizontal cut-outs which are associated with the contrate gears and through which the axle shafts are guided to the contrate gears and in which the axle shafts can be pivoted about the steering axle in accordance with the handlebar movement;
   d) at least one inner and one outer bearing shell for each axle shaft, wherein the axle shaft is rotatably mounted in an angular ball bearing accommodated by the inner bearing shell and in a needle bearing accommodated by the outer bearing shell; and
   e) a front plate and a rear plate, which are joined to the lower gear plate, the upper gear plate, the bearing shells, the bearing plates and the fork mount by way of screw connections.

9. The load and transport cart according to claim 8, wherein there are two upwardly projecting steering columns each in the form of a sheet metal piece that is bent multiple times and attached to the upper gear plate by way of screw connections, wherein the sheet metal piece is formed of a base leg that faces the gear plate and has cut-outs for the extension in the upper gear plate accommodating the upper tapered roller bearing and for attachment, an outer wall section projecting perpendicularly upward from the base leg, an oblique wall part projecting outwardly from the outer wall section, and a side wall part projecting perpendicularly upward from the the outer wall section, and a box-shaped base part is placed on and attached approximately at a height of an inwardly extending oblique wall part, and a support panel for forming the receiving compartment for insertion of the rechargeable battery on the front side is disposed on the base legs of the two steering columns, and the loading platform is box-shaped and inserted into and held in the base part.

10. The load and transport cart according to claim 9, wherein the handlebar comprises a pipe and at least two holders disposed above each other for the handlebar pipe are provided in an upper region of the side wall part of each of the sheet metal pieces, a mechanism is provided for adjusting height of the handlebar and for locking the handlebar in or releasing the handlebar from a height to which the handlebar is adjusted, and the side wall part is provided with a removable outer facing.

11. The load and transport cart according to claim 1, wherein the receiving compartment for the rechargeable battery is provided with a flap adapted to cover the battery and that can be pivoted away in the travel direction and comprises an angled panel that is adapted to the inclination of the loading platform for supporting the rechargeable battery.

12. A load and transport cart according to claim 1, wherein the loading platform comprises a base that is provided with a rim to receive a transport container in a stable manner.

13. The load and transport cart according to claim 12, wherein the transport container is comprised of a base part that is adapted to the base of the loading platform, and a front part and a rear part which are hinged to the base part by way of hinges, wherein an opening angle between the front and rear parts is dimensioned so that at least three beverage crates can be stacked on top of each other, wherein the front and rear parts can be connected to each other in a securing manner by a flexible adjustable tightening strap.

14. The load and transport cart according to claim 12, wherein the transport container is formed of a front part and a reinforced base or of a flexible container or sack.

15. The load and transport cart according to claim 14, wherein the front part of the transport container is configured so that side walls of the front part overlap side walls of the rear part during closing.

16. A load and transport cart according to 3, wherein the injection molded plastic is impact-resistant plastic, the cast metal is aluminum or an aluminum alloy, and the sheet metal is steel.

17. The load and transport cart according to claim 8, wherein an end of the footboard located at the front in the travel direction comprises a connecting element comprising two legs that are mutually spaced apart and parallel to each other, wherein a roller is rotatably mounted in the legs at a front end of the connecting element for stably folding up the footboard, and the legs are provided with a recess facing upwardly like an upper face of the footboard for receiving a spliced shaft that is disposed between the U-profile-shaped legs or receiving panels of the fork mount and is disposed in alignment with the recess in an opening of the legs or the receiving panels, wherein a pivotably mounted lever between the legs or the receiving panels is provided for locking and releasing the footboard, and a through-hole for receiving a joint axis for folding up the footboard is provided in a web, the joint axis being guided through the opening in the U-profile-shaped legs or the receiving panels.

18. The load and transport cart according to claim 17, wherein the footboard is provided with a worm gear mechanism which is driven by a motor and is operatively connected to the joint axis for folding the footboard up and unfolding the footboard down.

19. The load and transport cart according to claim 1, wherein the handlebar is provided with a brake actuating device, a device for accelerating, a bell, an indicator light, headlights and a dashboard which includes a compartment having a transparent cover for reading and accommodating a telecommunications device in a water-proof manner, a connection that is connected to the rechargeable battery for Charging the telecommunications device, a display device for charge state and safety of the rechargeable battery, and a speed indicator.

20. The load and transport cart according to claim 1, wherein the footboard comprises a foldable and height-adjustable standing support for the driver, the standing seat is comprised of two legs, a U-shaped arch comprising a backrest at a center of the arch, and two tubular rods in which the legs are inserted and are adjustable in height thereof and fixable in the height to which adjusted, and the tubular rods are rotatably mounted in bearing brackets that are rigidly installed on the footboard, the tubular rods being fixed in a vertical position and in the folded position.

21. The load and transport cart according to claim 1, wherein a fold-out prop is provided at a front of the cart.

22. The load and transport cart according to claim 1, further comprising a rear wheel driven by a wheel hub motor.

23. The load and transport cart according to claim 1, further comprising a wheel hub motor driving the front wheels, and a rear swivel wheel.

24. The load and transport cart according to claim 16, wherein the steel is stainless steel.

* * * * *